(12) United States Patent
Ishidera

(10) Patent No.: US 7,522,766 B2
(45) Date of Patent: Apr. 21, 2009

(54) PICTURE READING METHOD, PROGRAM AND DEVICE, PRINCIPAL COLOR EXTRACTING METHOD, PROGRAM AND DEVICE, AND IMAGE DIVIDING METHOD, PROGRAM AND DEVICE

(75) Inventor: Eiki Ishidera, Tokyo (JP)

(73) Assignee: NEC Corporation, Tokyo (JP)

( * ) Notice: Subject to any disclaimer, the term of this patent is extended or adjusted under 35 U.S.C. 154(b) by 821 days.

(21) Appl. No.: 11/110,892

(22) Filed: Apr. 21, 2005

(65) Prior Publication Data
US 2005/0238229 A1    Oct. 27, 2005

(30) Foreign Application Priority Data
Apr. 22, 2004    (JP) .............................. 2004-126675

(51) Int. Cl.
*G06K 9/00*    (2006.01)
(52) U.S. Cl. ..................... 382/165; 382/162; 382/166; 382/173
(58) Field of Classification Search ................. 382/166, 382/165, 173, 181, 162; 345/473; 348/652, 348/654, E9.04; 358/539; 375/E7.166
See application file for complete search history.

(56) References Cited
U.S. PATENT DOCUMENTS
5,787,192 A * 7/1998 Takaichi et al. ............. 382/166

FOREIGN PATENT DOCUMENTS

| JP | 07-73313 A | 3/1995 |
|----|----|----|
| JP | 2000-251016 A | 9/2000 |
| JP | 2001-222680 A | 8/2001 |
| JP | 2003-85535 A | 3/2003 |

* cited by examiner

*Primary Examiner*—Anh Hong Do
(74) *Attorney, Agent, or Firm*—Sughrue Mion, PLLC

(57) ABSTRACT

A method for reading a picture is provided which is capable of removing adverse effects caused by lighting conditions or a like. A principal color extracting section extracts principal colors from a color image input by an image inputting section based on a local peak value shown in a color histogram obtained from the color image and divides the color image into principal color images each corresponding to each of the extracted principal colors. A combination creating section creates a combined image by combining separated principal color images. A picture region extracting section extracts character region candidates from the principal color image and combined image. A picture recognizing section performs character recognizing processing on all extracted character region candidates to obtain the best character reading result according to a character recognizing confidence of character recognizing processing results.

32 Claims, 14 Drawing Sheets

- red color
- dark blue color
- blue color
- sky blue color
- white color
- rose color
- red color
- bluish green color

PICTURE READING METHOD, PROGRAM AND DEVICE, PRINCIPAL COLOR EXTRACTING METHOD, PROGRAM AND DEVICE, AND IMAGE DIVIDING METHOD, PROGRAM AND DEVICE

BACKGROUND OF THE INVENTION

1. Field of the Invention

The present invention relates to a picture reading method, program and device, a principal color extracting method, program and device, and an image dividing method, program and device, each being capable of reading pictures in an input image with high accuracy.

The present application claims priority of Japanese Patent Application No. 2004-126675 filed on Apr. 22, 2004, which is hereby incorporated by reference.

2. Description of the Related Art

Conventionally, various types of picture readers (picture reading devices) are proposed that automatically recognize pictures contained in an image picked up by an image pickup device, for example, a CCD (Charge-Coupled Device) camera or a like. As examples, a "number plate recognizing device" is disclosed in Japanese Patent Application Laid-open No. 2000-251016 and a "number reader (number reading device)" is disclosed in Japanese Patent Application Laid-open No. 2001-222680. These devices employ a method of recognizing a character being a picture by using a gray-scale image.

In Japanese Patent Application Laid-open No. 2003-85535, a "position recognizing method for a road guiding sign" is disclosed. In this method, a component of a color registered in advance is extracted from a color image of the road guiding sign and a character region is then extracted by the extraction of the component of the color to perform character recognizing processing.

Furthermore, an "image separating method and its device" is disclosed in Japanese Patent Application Laid-open No. Hei 07-73313. In the disclosed technology, an image region is over-separated according to a color and the over-separated regions are combined into character and background regions so that the character region is extracted in a stable manner without being affected by a shadow and/or a glare (highlight).

An image of a subject to be picked up by an image pickup device is multifarious. For example, there is a great difference in a displaying method between a number plate to display a registration number of a vehicle being employed in Japan (simply called a number plate) and a license plate to display a registration number of a vehicle being employed in the North America (simply called a license plate). The displaying method of the number plate is comparatively simple, however, the displaying method of the license plate is complicated when compared with the number plate. More specifically, in the case of the displaying method of the license plate, a design and/or format including a color to be used for its background are diversified and a font and its color to be used for a character are also various.

For example, FIG. 23 is an example of an image of a license plate in which a word "California" is written in a red color in its upper portion and characters "123" representing a license number are written in a bluish green color in its center portion. As shown in FIG. 23, there is a background portion, in which gradation processing is performed using a dark blue color in an upper half of the license plate, being changed gradually to be a white color toward a center portion from its upper portion and there is a background portion, in which gradation processing is performed using a red color in a lower half of the license plate, being changed gradually to be a white color toward a center from its lower portion.

FIG. 24 is a diagram showing an example of an image obtained by displaying the color image of FIG. 23 on a gray scale. In this case, since color gradation processing is performed in the character portion, in some cases, pixel values in the character regions are not always a maximum or a minimum in an input image.

As a result, the above conventional technologies have technical problems. That is, even when threshold processing on a pixel value to binarize the pixel is performed on an image represented on a gray scale by using the technology disclosed in the Japanese Patent Application Laid-open Nos. 2000-251016 and 2001-222680 and a character region is extracted using the above pixel, the character region such as "California" and/or "123" cannot be extracted with high accuracy.

Due to these technological problems, when the conventional method using the gray-scale image is used, the character region cannot be separated accurately from its background in the license plate and, therefore, accurate and automatic reading of a license number is difficult.

As one technological means to solve these problems, a method may be provided in which a character region is obtained by extracting a region having a color corresponding to a license number from a color license plate image acquired by picking up the license plate image using a CCD camera.

For example, as one of the technologies described above, by using the method disclosed in the Japanese Patent Application Laid-open No. 2003-855353, a method is available in which a component of a color registered in advance is extracted from a color image of a license plate and, by using the extracted component of a color, a character region is extracted and character recognizing processing is performed.

However, the technology disclosed in the Japanese Patent Application Laid-open No. 2003-855353 has a following problem. That is, when character recognizing processing is performed, by using the technology disclosed in the Japanese Patent Application Laid-open No. 2003-855353, on a license plate which employs very diversified colors, it is difficult to register, in advance, colors that may be used for the character. As a result, when the method for obtaining a character region by extracting colors registered in advance is used, the character region and background region can not be accurately separated from the license plate and automatic reading of a license number is difficult.

Furthermore, a factor that interferes with successful separation of a character region and background region is that, when the technology disclosed in the Japanese Patent Application Laid-open No. 2003-855353 is used outside, lighting conditions differ depending on environments in which an image is picked up during daytime, in evening, or at night and, therefore, even if an image of the same plate is picked up, color information is not uniform depending on the environment in which the image is picked up. For example, in the case where a license plate has a sky blue background and dark blue characters, when an image of the license plate is picked up in a state in which the license plate is lighted by the afternoon sun, a red component in an entire image becomes very intense and, therefore, when the image of the license is picked up during the daytime, even in the region in which a blue component becomes most intense, the red component becomes most intense in some cases.

Therefore, accurate extraction of a character region is difficult only by using the technology disclosed in the Japanese Patent Application Laid-open No. 2003-855353, which makes it difficult to automatically read a license number with high accuracy. That is, the above technology presents a problem in that, when a character region is extracted from a license plate, what color is used for a character in the character region is unknown and, therefore, it is difficult to extract a character region in a stable manner by using the method in which a component of a color having been registered in advance is extracted from a color image. As described above, in an outdoor environment, color components making up a character region are separated into a plurality of color components due to adverse effects caused by shadow areas or glare (highlight) areas on the license plate, which makes it more difficult to achieve stable extraction of a character region.

To solve such technological problems as described above, such technology disclosed in Japanese Patent Application Laid-open No. Hei 07-73313 is available. In the disclosed technology, by over-dividing a region of an image based on a color and combining the over-separated region, a character region can be extracted in a stable manner without being affected by shadow areas and/or glare (highlight) areas. However, in the technology disclosed in the Japanese Patent Application Laid-open No. Hei 07-73313, in the case of an image of a subject to be picked up which is made up of a color and shape having been defined in advance such as a road sign, it is possible to judge whether or not a color and shape is to be combined by comparing the color and shape with those contained in a dictionary stored in advance; however, when the above technology is applied to a license plate having a variety of colors and designs, it is necessary that an enormous amount of data about colors and shapes has to be stored in advance, which is not realistic.

Moreover, a region to be combined according to the technology disclosed in the Japanese Patent Application Laid-open No. Hei 07-73313 is not always a character region which is desired to be extracted. That is, there is a problem that, whether or not a character is extracted exactly is not judged substantially unless whether or not an extracted object is recognized as a character. Therefore, the above technology has a problem in that, since only a region extracted according to a reference which does not always coincide with a reference for character recognition defined in the above technology is extracted as a candidate for a character, accurate extraction of a character region is difficult. Therefore, a technological problem remains still unsolved in that accurate and automatic reading of a license number is difficult.

SUMMARY OF THE INVENTION

In view of the above, it is an object of the present invention to provide a picture reading method, program and device, a principal color extracting method, program and device, and an image dividing method, program and device, each being capable of reading pictures in an input image with high accuracy by extracting a picture region, in a stable manner, in an object to be read which has various colors, designs, or a like.

According to a first aspect of the present invention, there is provided a picture reading method including:

a step of extracting color components having a high frequency of occurrence in an input image, as principal colors;

a step of separating the input image into images each corresponding to each of the extracted principal colors; and a step of combining the separated images, out of the separated images, whose principal colors have specified relation with one another; and a step of reading a picture based on the separated images and the combined images.

According to a second aspect of the present invention, there is provided a picture reading method including:

a step of extracting color components having a high frequency of occurrence in an input image, as principal colors;

a step of separating the input image into images each corresponding to each of the extracted principal colors;

a step of comparing a degree of difference in color among the principal colors making up each of the separated images;

a step of combining the separated images, out of the separated images, whose principal colors have specified relation with one another, based on a result from the comparison; and a step of reading a picture based on the separated images and the combined images.

In the foregoing first and second aspects, a preferable mode is one wherein the extraction of the principal colors is performed by separating two or more color components contained in a calorimetric system representing the input image into a specified number of color component zones, by using a center of a first color component zone, as a temporary principal color center, when a color component value within the first color component zone forms a peak against color component values within second color component zones being adjacent to the first color component zone and exceeds a first pre-determined threshold value, by calculating a mean value of the color components having a value representing similarity of a color between the color components that is larger than a predetermined second threshold value, out of the color components being distributed with the temporary principal color center being used as a center and using the mean value as a principal color center, and by making each of the color components having a value representing similarity of a color between the color components that is larger than a predetermined third threshold value be contained in the principal colors, out of the color components being distributed with the principal color center being used as a center.

Another preferable mode is one wherein the separation of said images is performed by preparing an image for every extracted principal color, by judging as to whether a pixel for every prepared image input belongs to any one of the extracted principal colors, and by using as a first pixel value the pixel belonging to any one of the extracted principal colors, and on the other hand, by using as a second pixel value the pixel belonging to no one of the principal colors.

Still another preferable mode is one wherein the reading of a picture is performed by extracting picture region candidates from the separated images and combined images, by performing picture recognizing processing on all the extracted picture region candidates, and by performing picture reading processing according to a result from said picture recognizing processing.

A further preferable mode is one wherein the extraction of picture region candidates is performed by excluding, from said picture region candidates, out of said picture region candidates in which pixel values representing the separated images and combined images occur continuously in horizontal and/or vertical directions, said picture region candidates in which the number of pixel values occurring continuously in horizontal and/or vertical directions is larger than a predetermined ratio of the number of pixels in the horizontal and vertical directions in the input image and by comparing the number of pixel values occurring continuously in the horizontal and/or vertical directions in coordinates serving as a center of the non-excluded picture region candidate with the number of the pixel occurring in the horizontal and vertical directions in the input image and by judging, based on results from the comparison, whether the non-excluded picture region candidate is used as said picture region candidates.

According to a third aspect of the present invention, there is provided a principal color extracting method comprising:

a step of separating two or more color components contained in a calorimetric system representing an input image into a specified number of color component zones;

a step of using a center of a first color component zone, as a temporary principal color center, when a color component value within the first color component zone forms a peak against color component values within second color component zones being adjacent to the first color component zone and exceeds a first pre-determined threshold value;

a step of calculating a mean value of the color components having a value representing similarity of a color between the color components that is larger than a predetermined second threshold value, out of the color components being distributed with the temporary principal color center being used as a center and using the mean value as a principal color center, and a step of extracting as principal colors the color components each having a value representing similarity of a color between the color components that is larger than a predetermined third threshold value, out of the color components being distributed with the principal color center being used as a center.

According to a fourth aspect of the present invention, there is provided an image dividing method including:

a step of separating two or more color components contained in a colorimetric system representing an input image into a specified number of color component zones;

a step of using a center of a first color component zone, as a temporary principal color center, when a color component value within the first color component zone forms a peak against color component values within second color component zones being adjacent to the first color component zone and exceeds a first pre-determined threshold value;

a step of calculating a mean value of the color components having a value representing similarity of a color between the color components that is larger than a predetermined second threshold value, out of the color components being distributed with the temporary principal color center being used as a center and using the mean value as a principal color center;

a step of extracting as principal colors the color components each having a value representing similarity of a color between the color components being larger than a predetermined third threshold value, out of the color components being distributed with the principal color center being used as a center;

a step of preparing images each corresponding to each of the extracted principal colors, a step of judging as to whether a pixel for every prepared image belongs to any one of the extracted principal colors; and a step of separating an input image into images each corresponding to each of principal colors by using as a first pixel value the pixel belonging to any one of the extracted principal colors, and on the other hand, by using as a second pixel value the pixel belonging to no one of the principal colors, as obtained from the result of the judgment.

According to a fifth aspect of the present invention, there is provided a picture reading device including:

a principal color extracting section to extract color components having a high frequency of occurrence in an input image, as principal colors;

an image separating section to separate the input image into images each corresponding to each of the extracted principal colors extracted by said principal color extracting section;

an image combining section to combine the separated images, out of the separated images obtained by the separating operation of said image separating section, whose principal colors have specified relation with one another; and a picture reading section to read a picture based on said images obtained by the separation by said image separating section and said images obtained by the combination by said image combining section.

According to a sixth aspect of the present invention, there is provided a picture reading device including:

a principal color extracting section to extract color components having a high frequency of occurrence in an input image, as principal colors;

an image separating section to separate the input image into images each corresponding to each of the principal colors extracted by said principal color extracting section;

a comparing section to compare a degree of difference in color among the principal colors making up the images separated by said image separating section;

an image combining section to combine the separated images, out of the separated images, whose principal colors have specified relation with one another, based on a result from the comparison by said comparing section; and a picture reading section to read a picture based on images obtained by the separating operation of said image separating section and said images obtained by the combination by said image combining section.

In the foregoing fifth and sixth aspects, a preferable mode is one wherein said principal color extracting section comprises:

a separating section to separate two or more color components contained in a calorimetric system representing the input image into a specified number of color component zones;

a temporary principal color center determining section to determine a center of a first color component zone, as a temporary principal color center, when a color component value within the first color component zone obtained by operation of said separating section forms a peak against color component values within second color component zones being adjacent to the first color component zone and exceeds a first pre-determined threshold value;

a principal color center determining section to calculate a mean value of the color components having a value representing similarity of a color between the color components that is larger than a predetermined second threshold value, out of the color components being distributed with the temporary principal color center being used as a center and to determine the calculated mean value as a principal color center; and an extracting section to extract as principal colors the color components each having a value representing similarity of a color between the color components that is larger than a predetermined third threshold value, out of the color components being distributed with the principal color center determined by said temporary principal color center determining section being used as a center.

Another preferable mode is one wherein said image separating section comprises:

an inputting section to input an image for every principal color extracted by said principal color extracting section; and a creating section to create an image made up of principal colors by judging as to whether a pixel for every image input from said inputting section belongs to any one of the extracted principal colors, and by using as a first pixel value the pixel belonging to any one of the extracted principal colors, and on the other hand, by using as a second pixel value the pixel belonging to no one of the principal colors.

A further preferable mode is one wherein said picture reading section comprises:

a candidate extracting section to extract picture region candidates from said images obtained by the separation by said image separating section and the combined images obtained by the combination by said image combining section;

a picture recognizing section to perform picture recognizing processing on all picture region candidates extracted by said candidate extracting section; and a reading section to read a picture based on a result from said picture recognizing processing obtained by the recognition by said picture recognizing section.

A still further preferable mode is one said candidate extracting section comprises:

a candidate excluding section to exclude, from said picture region candidates, out of said picture region candidates in which pixel values representing said images obtained by the separation by said image separating section and said images obtained by the combination by said image combining section occur continuously in horizontal and/or vertical directions, said picture region candidates in which the number of pixel values occurring continuously in the horizontal and/or vertical directions is larger than a predetermined ratio of the number of pixels in the horizontal and vertical directions in the input image;

a comparing section to compare the number of pixel values occurring continuously in the horizontal and/or vertical directions in coordinates serving as a center of the picture region candidate not having been excluded by said candidate excluding section with the number of pixels in the horizontal and vertical directions in the input image; and a judging section to judge, based on results from the comparison by said comparing section, whether said picture region candidates not having been excluded are used as said picture region candidates.

According to a seventh aspect of the present invention, there is provided a principal color extracting device including:

a separating section to separate two or more color components contained in a calorimetric system representing an input image into a specified number of color component zones;

a temporary principal color center determining section to determine a center of a first color component zone, as a temporary principal color center, when a color component value within the first color component zone obtained by operation of said separating section forms a peak against color component values within second color component zones being adjacent to the first color component zone and exceeds a first pre-determined threshold value;

a principal color center determining section to calculate a mean value of the color components having a value representing similarity of a color between the color components that is larger than a predetermined second threshold value, out of the color components being distributed with the temporary principal color center determined by said temporary principal color center determining section being used as a center and to determine the calculated mean value as a principal color center; and an extracting section to extract, as principal colors, the color components each having a value representing similarity of a color between the color components that is larger than a predetermined third threshold value, out of the color components being distributed with the principal color center determined by said temporary principal color center determining section being used as a center.

According to an eighth aspect of the present invention, there is provided an image dividing device including:

a separating section to separate two or more color components contained in a colorimetric system representing the input image into a specified number of color component zones;

a temporary principal color center determining section to determine a center of a first color component zone, as a temporary principal color center, when a color component value within the first color component zone obtained by operation of said separating section forms a peak against color component values within second color component zones being adjacent to the first color component zone and exceeds a first pre-determined threshold value;

a principal color center determining section to calculate a mean value of the color components having a value representing similarity of a color between the color components being larger than a predetermined second threshold value, out of the color components being distributed with the temporary principal color center determined by said temporary principal color center determining section being used as a center and to determine the calculated mean value as a principal color center;

an extracting section to extract, as principal colors, the color components each having a value representing similarity of a color between the color components that is larger than a predetermined third threshold value, out of the color components being distributed with the principal color center determined by said temporary principal color center determining section being used as a center;

an inputting section to input an image for every said principal color extracted by said extracting section; and a principal color image outputting section to output an image made up of principal colors by judging as to whether a pixel for every image input from said inputting section belongs to any one of the extracted principal colors, and by using as a first pixel value the pixel belonging to any one of the extracted principal colors, and on the other hand, by using as a second pixel value the pixel belonging to no one of the principal colors.

According to a ninth aspect of the present invention, there is provided a controlling program to make a computer execute the picture reading method as set forth in the first aspect or the second aspect.

According to a tenth aspect of the present invention, there is provided a controlling program to make a computer execute the principal color extracting method as set forth in the third aspect.

According to an eleventh aspect of the present invention, there is provided a controlling program to make a computer execute an image dividing method as set forth in the fourth aspect.

According to a twelfth aspect of the present invention, there is provided a controlling program to make a computer control the picture reading device as set forth in the fifth aspect or the sixth aspect.

According to a thirteenth aspect of the present invention, there is provided a controlling program to make a computer control the principal color extracting device as set forth in the seventh aspect.

According to a fourteenth aspect of the present invention, there is provided a controlling program to make a computer control the image dividing (separating) device as set forth in the eighth aspect.

With the above configurations, color components having high frequency of occurrence in an input image are extracted as principal colors and the input image is separated into images each corresponding to each of the extracted principal colors and images whose principal colors have specified relation with one another, out of the separated images, are combined and a picture is read based on the image obtained by combining the separated images and, therefore, factors that adversely affect image-pickup of a picture to be recognized made up of very diversified colors and designs, for example, instability in the picture extraction caused by variations in lighting conditions, shadows, glares (highlights), or a like can be removed. As a result, the extraction of a picture region can be performed in a most desirous reference that can be contributed to inhibition of the above adverse influence, thus improving accuracy in picture recognition.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings. A method of the present invention includes a step of extracting color components having a high frequency of occurrence in an input image, as principal colors, a step of separating the input image into images each corresponding to each of the extracted principal colors, a step of combining images whose principal colors have specified relation with one another, out of the separated images, a step of extracting candidates for a picture region based on the separated images and the combined images, and a step of performing picture recognizing processing on all the extracted picture region candidates, and a step of reading a picture according to a result from the picture recognizing processing.

Embodiment

Figure 1:
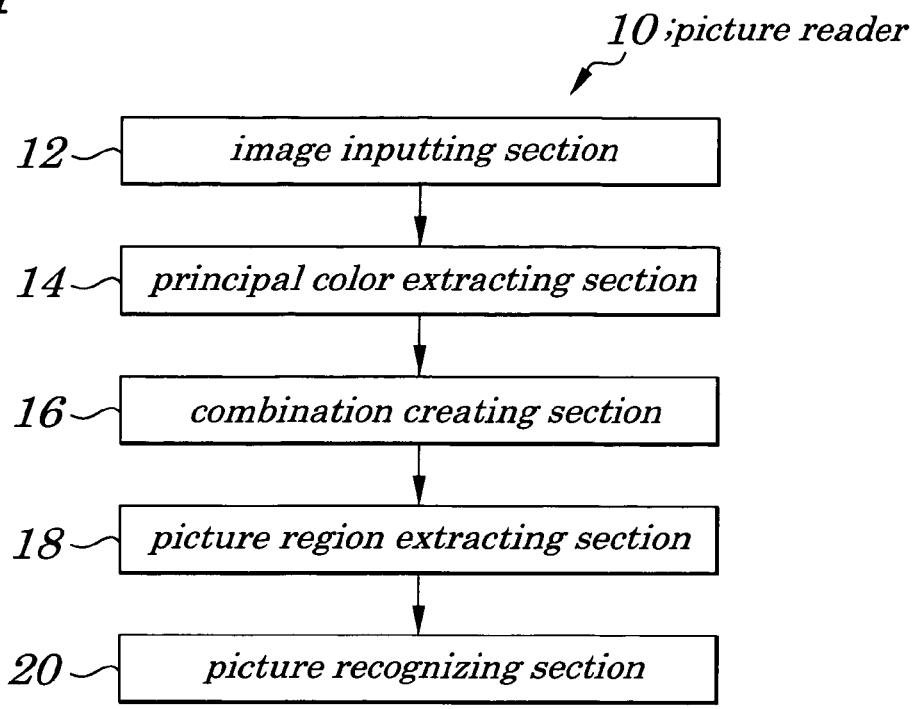
FIG. 1 is a diagram showing configurations of a picture reader according to an embodiment of the present invention.
Figure 2:
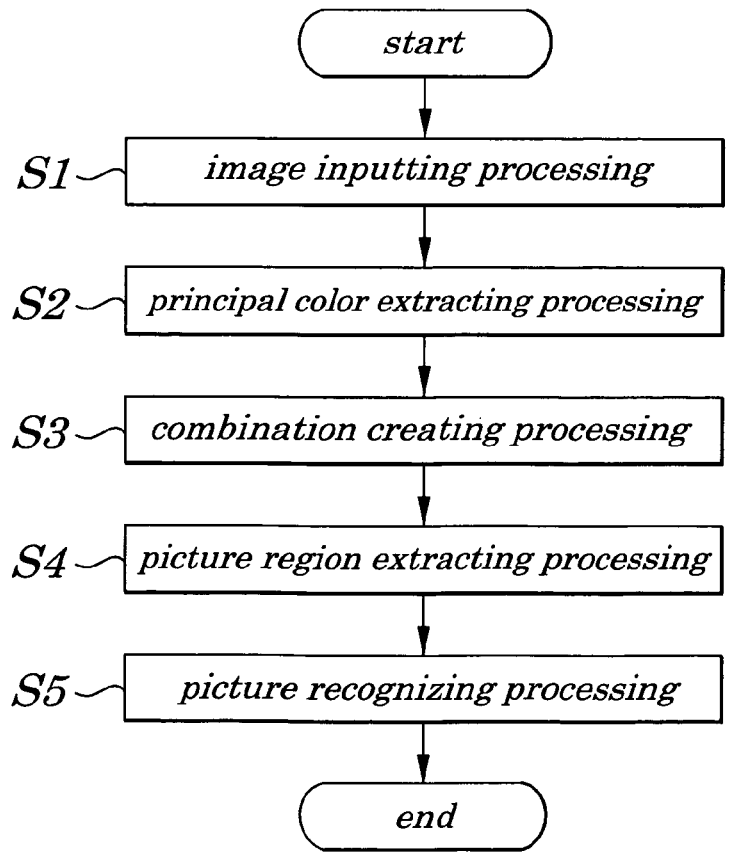
FIG. 2 is a diagram showing a processing flowchart of the picture reader of FIG. 1.
Figure 3:
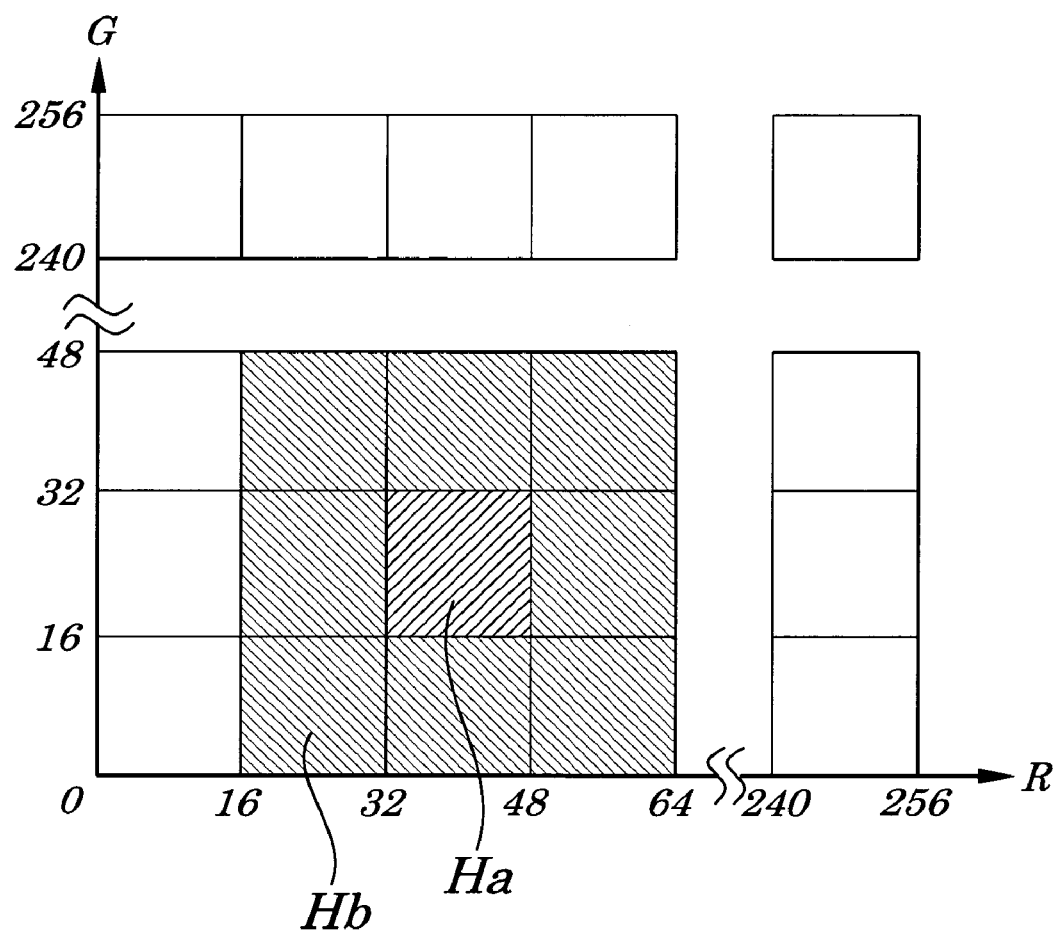
FIG. 3 is a diagram showing an example of a color histogram.
Figure 4:
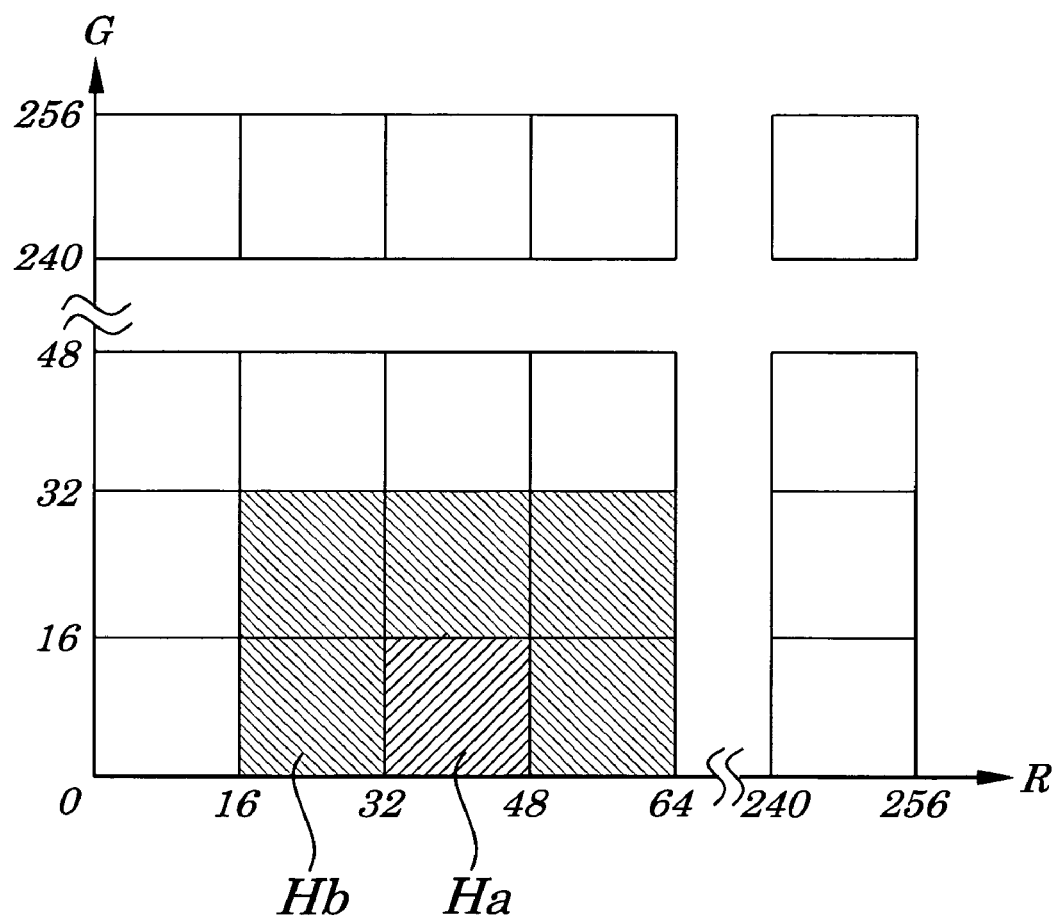
FIG. 4 is another example of a color histogram.
Figure 5:
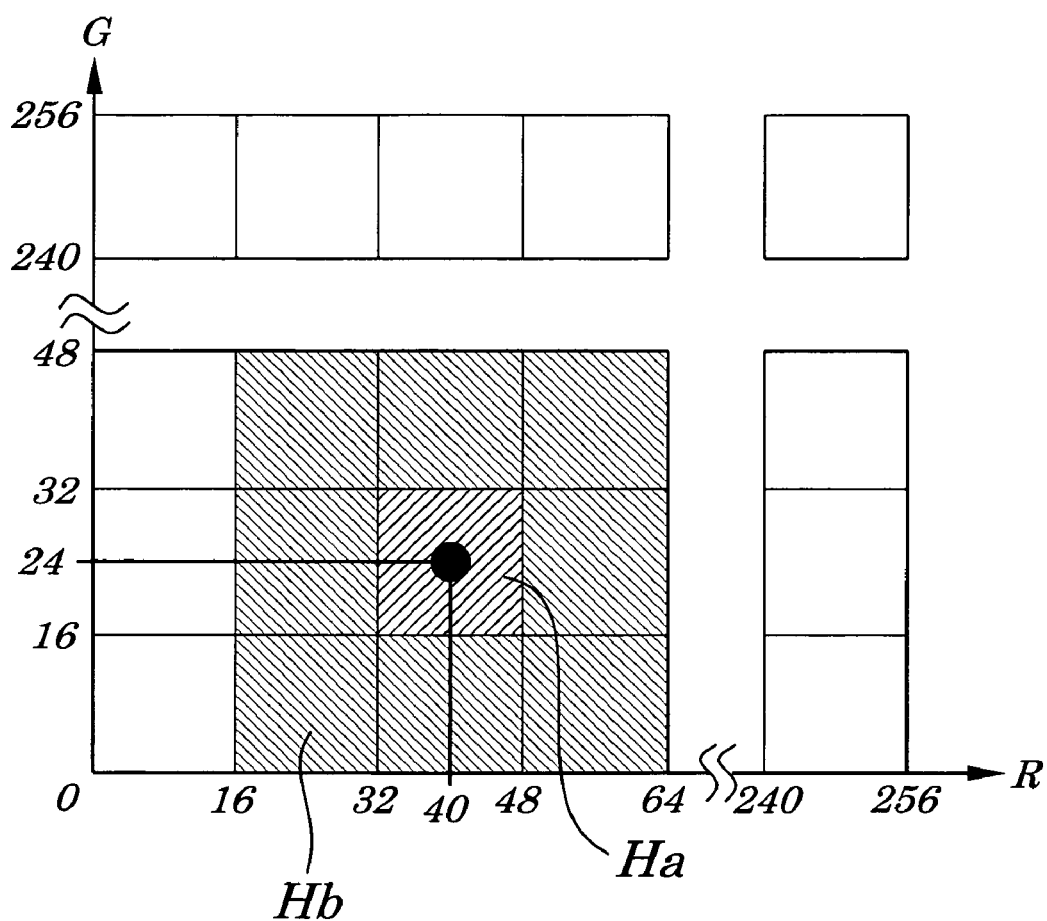
FIG. 5 is a diagram explaining a temporary center of principal colors.
Figure 6:
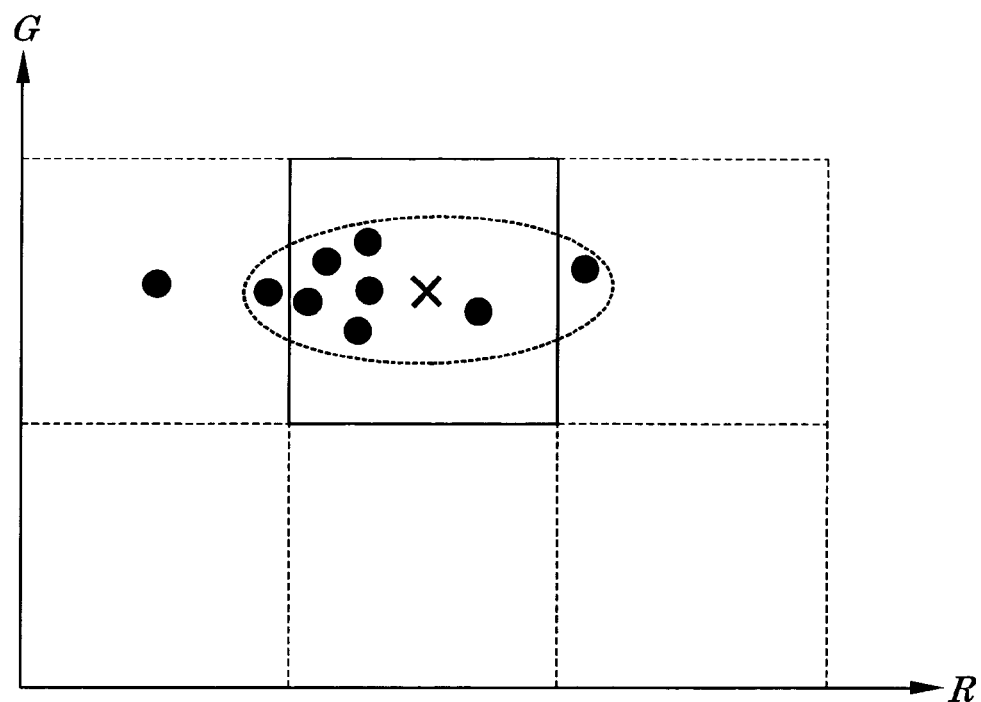
FIG. 6 is a diagram illustrating a state in the vicinity of the temporary center of principal colors.
Figure 7:
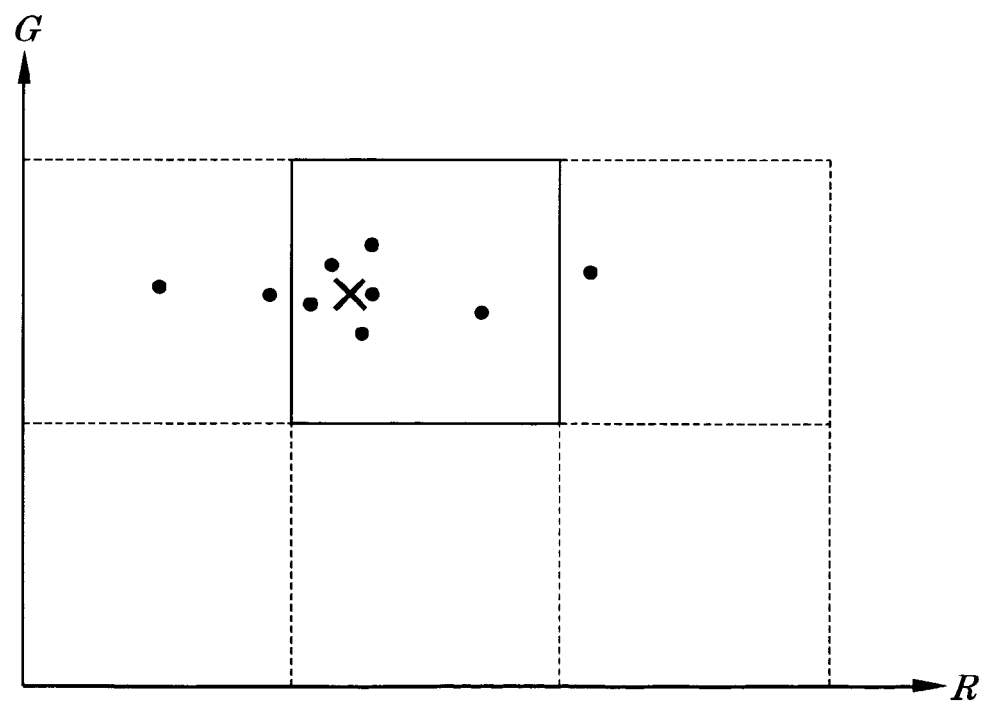
FIG. 7 is a diagram illustrating an example of a center of principal colors.
Figure 8A:
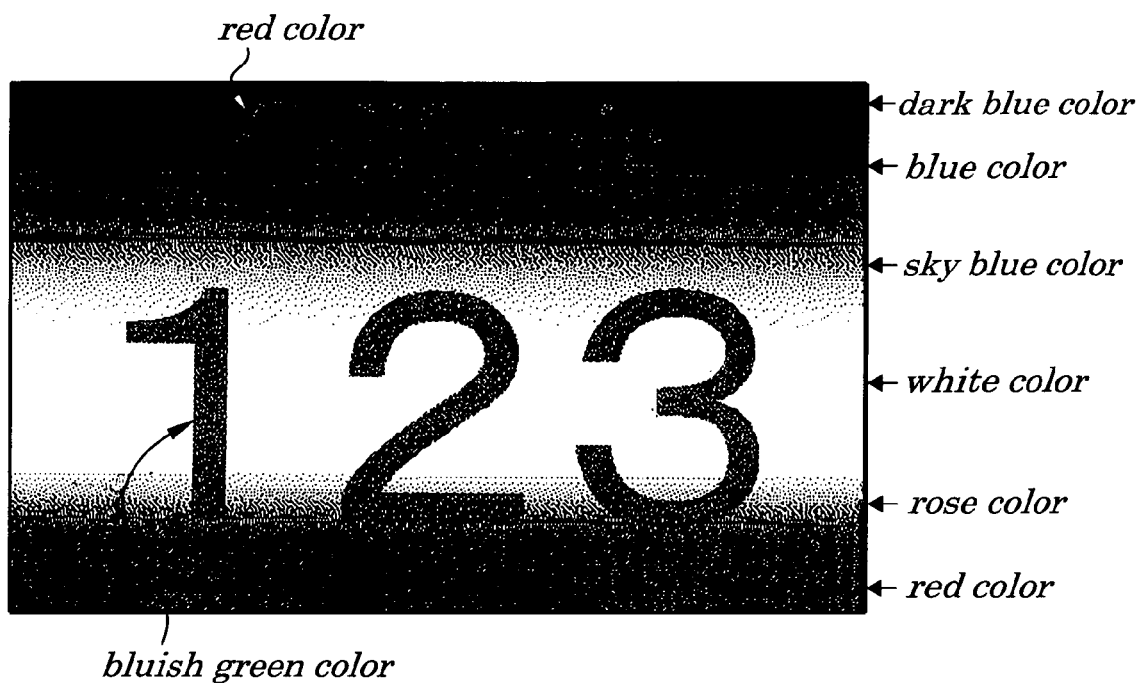
FIG. 8A is a view for showing an example of a color image of a license plate according to the same embodiment.
Figure 8B:
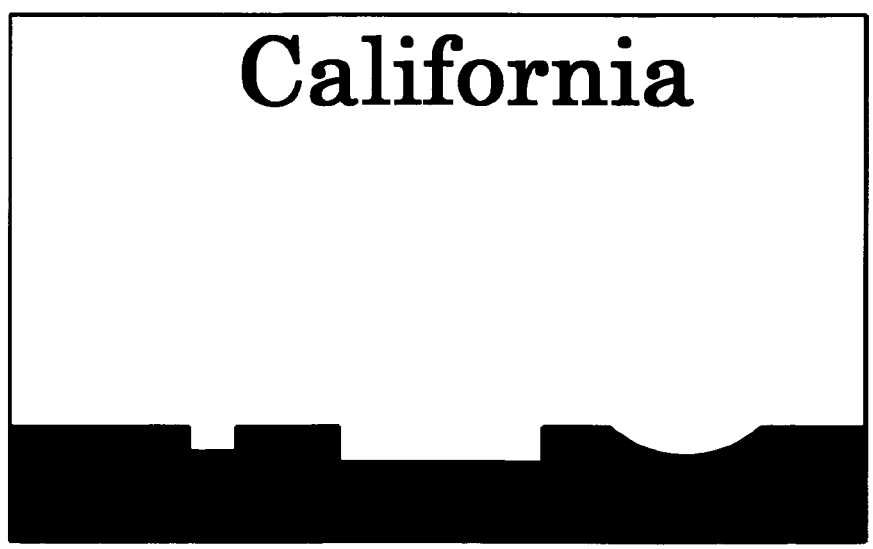
FIG. 8B is a diagram illustrating a first example of a principal color image created for a color image of FIG. 8A.
Figure 9:
FIG. 9 is a diagram illustrating a second example of the principal color image created for the color image of FIG. 8A.
Figure 10:
FIG. 10 is a diagram illustrating a third example of the principal color image created for the color image of FIG. 8A.
Figure 11:
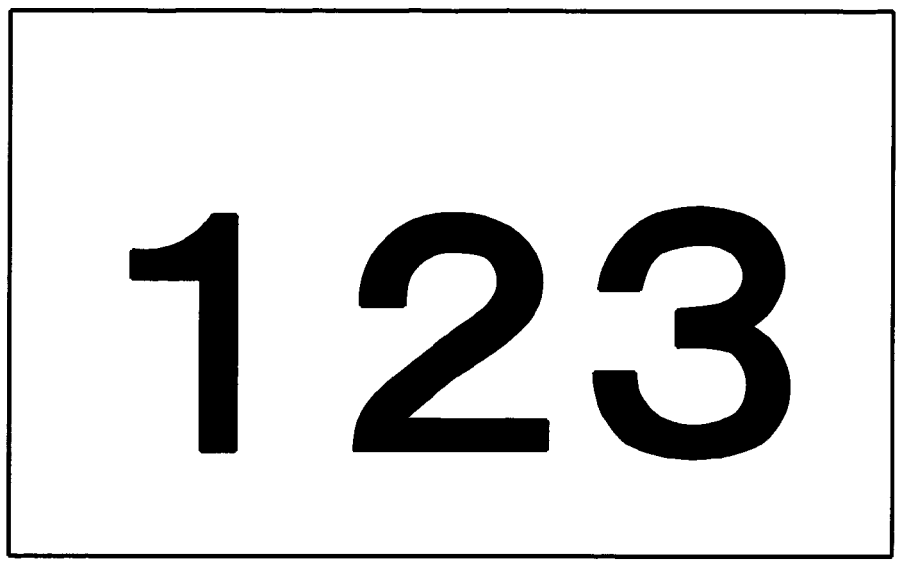
FIG. 11 is a diagram illustrating a fourth example of the principal color image created for the color image of FIG. 8A.

FIG. 1 is a diagram showing configurations of a picture reader 10 according to an embodiment of the present invention. FIG. 2 is a diagram showing a processing flowchart of the picture reader 10 of FIG. 1. FIG. 3 is a diagram showing an example of a color histogram. FIG. 4 is a diagram showing an another example of a color histogram. FIG. 5 is a diagram explaining a temporary center of principal colors. FIG. 6 is a diagram illustrating a state in the vicinity of the temporary center of the principal colors. FIG. 7 is a diagram illustrating an example of a center of the principal colors. FIG. 8A is a view for showing an example of a color image of a license plate according to the same embodiment, and FIG. 8B is a diagram illustrating a first example of a principal color image created for a color image of FIG. 8A FIG. 9 is a diagram illustrating a second example of a principal color image created for the color image of FIG. 8A. FIG. 10 is a diagram illustrating a third example of a principal color image created for the color image of FIG. 8A. FIG. 11 is a diagram illustrating a fourth example of a principal color image created for the color image of FIG. 8A.

Figure 12:
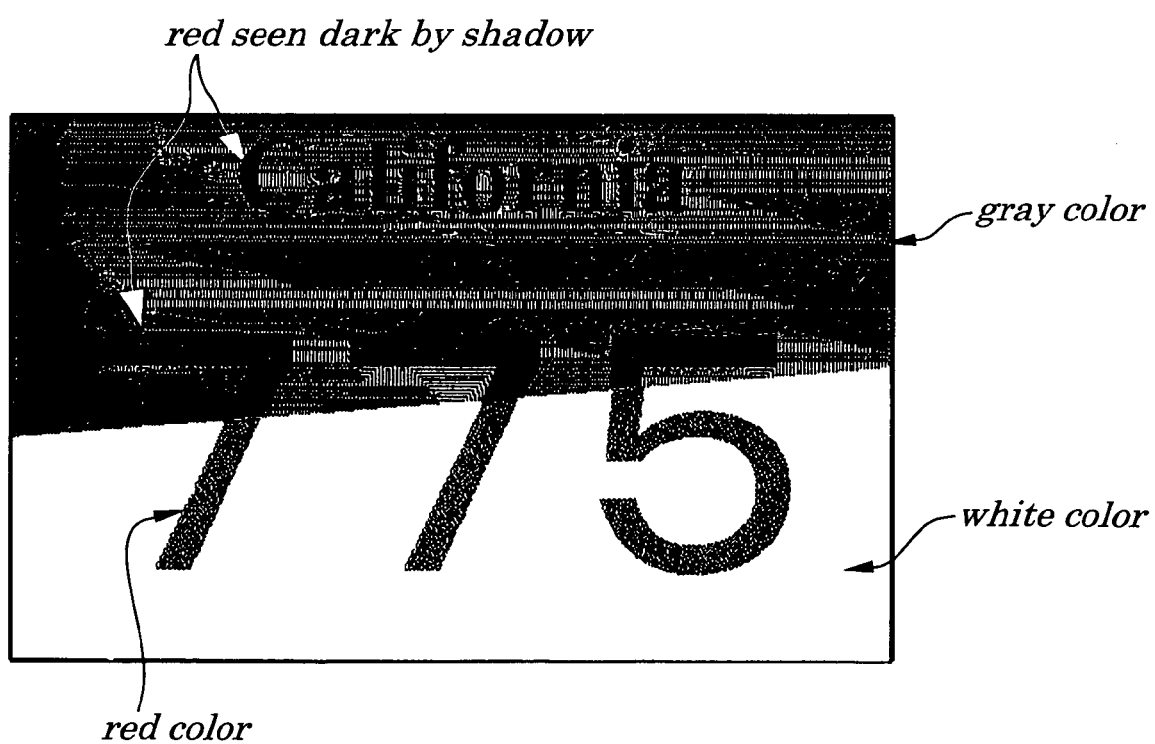
FIG. 12 is a diagram showing an example of a color image.
Figure 13:
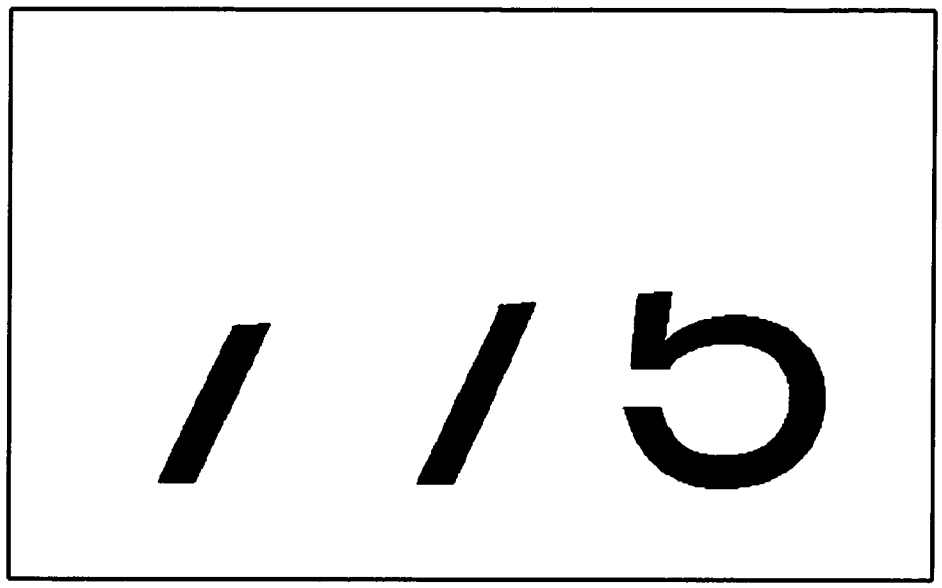
FIG. 13 is a diagram showing a first example of a principal color image created for the color image of FIG. 12.
Figure 14:
FIG. 14 is a diagram showing a second example of the principal color image created for the color image of FIG. 12.
Figure 15:
FIG. 15 is a diagram showing a third example of the principal color image created for the color image of FIG. 12.
Figure 16:
FIG. 16 is a diagram showing a fourth example of the principal color image created for the color image of FIG. 12.
Figure 17:
FIG. 17 is a diagram showing an example of a combined image obtained by combining a plurality of the principal color images created for the color image of FIG. 12.
Figure 18:
FIG. 18 is a diagram showing another example of the combined image obtained by combining a plurality of the principal color images created for the color image of FIG. 12.
Figure 19:
FIG. 19 is a diagram a combined image obtained after removing excessive run of the combined image of FIG. 18.
Figure 20:
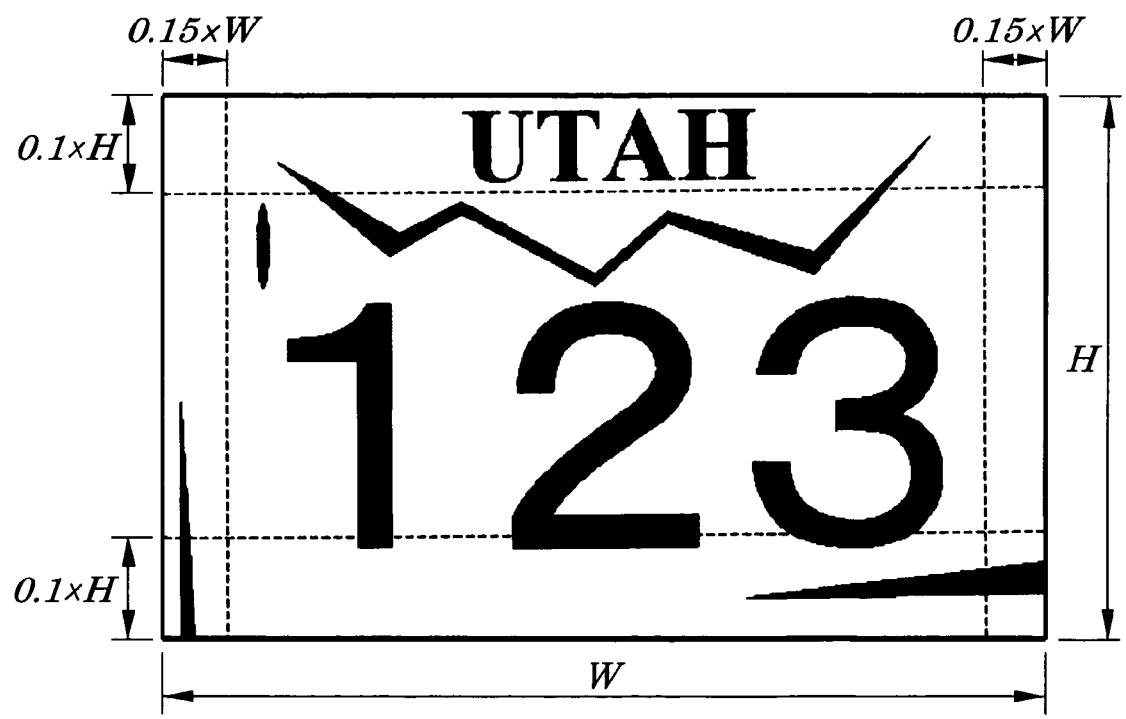
FIG. 20 is a diagram explaining regions on sides of higher/lower and right/left ends of the combined image of FIG. 19.
Figure 21:
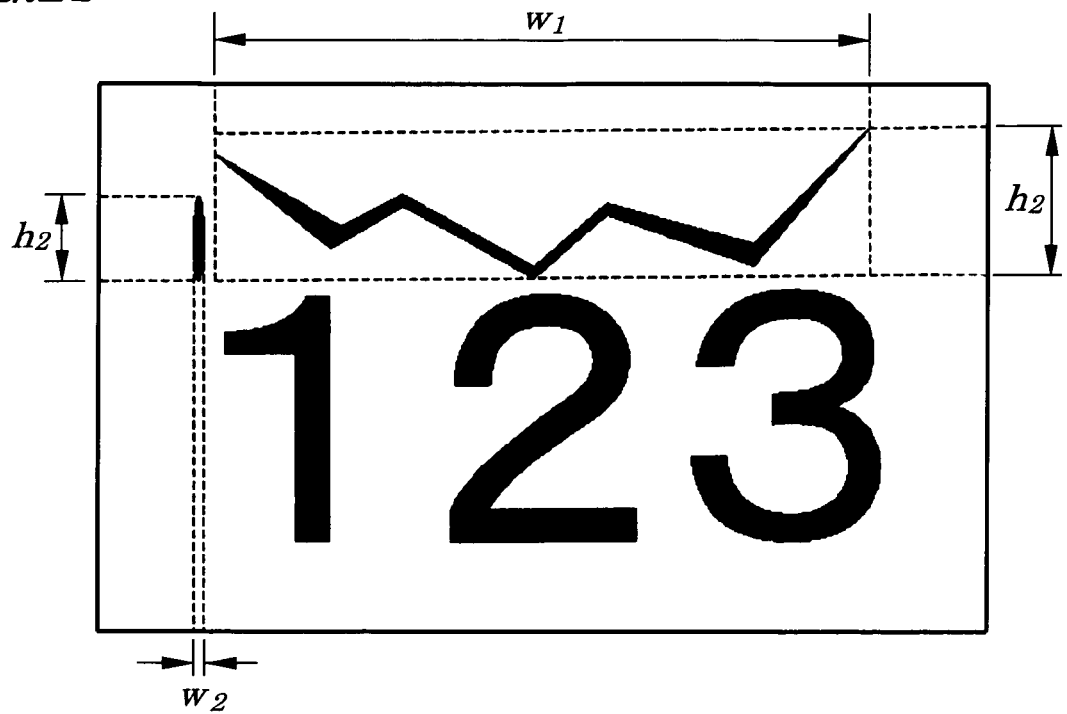
FIG. 21 is a diagram showing an example of a height and width of a connected portion in the combined image obtained after processing performed in FIG. 20.
Figure 22:
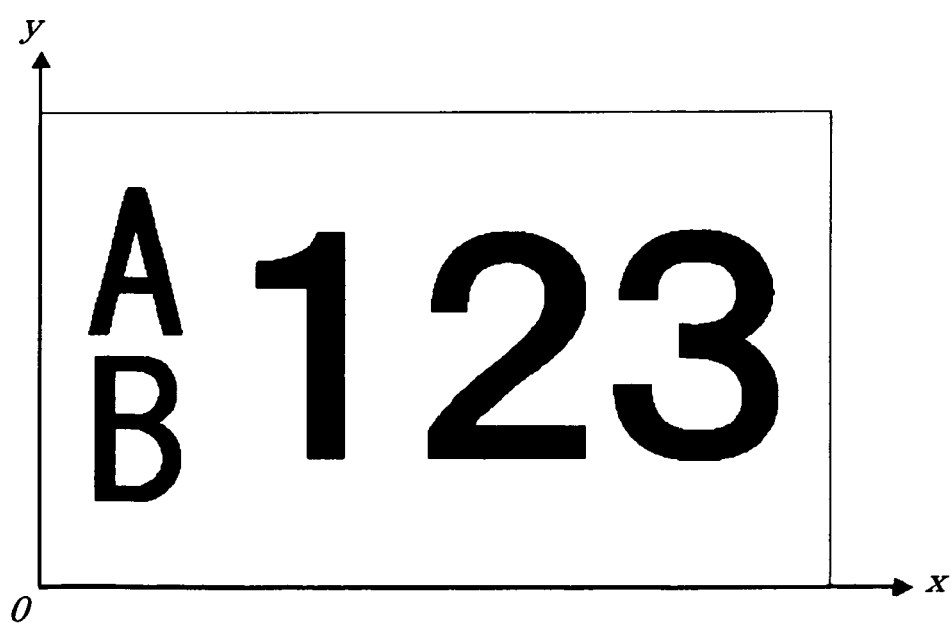
FIG. 22 is a diagram showing an example of an image in which characters as subjects to be recognized are aligned in a mixed manner in both longitudinal and horizontal positions.
Figure 23:
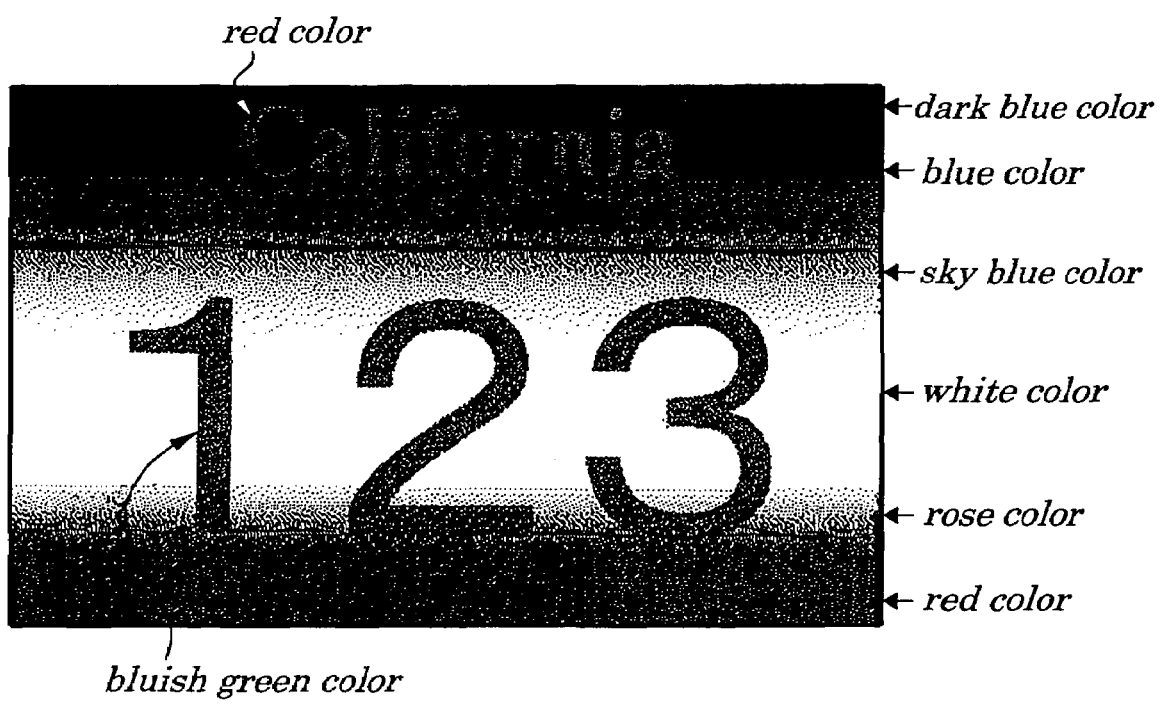
FIG. 23 is a view for explaining a conventional technology and for showing an example of a color image of a license plate.
Figure 24:
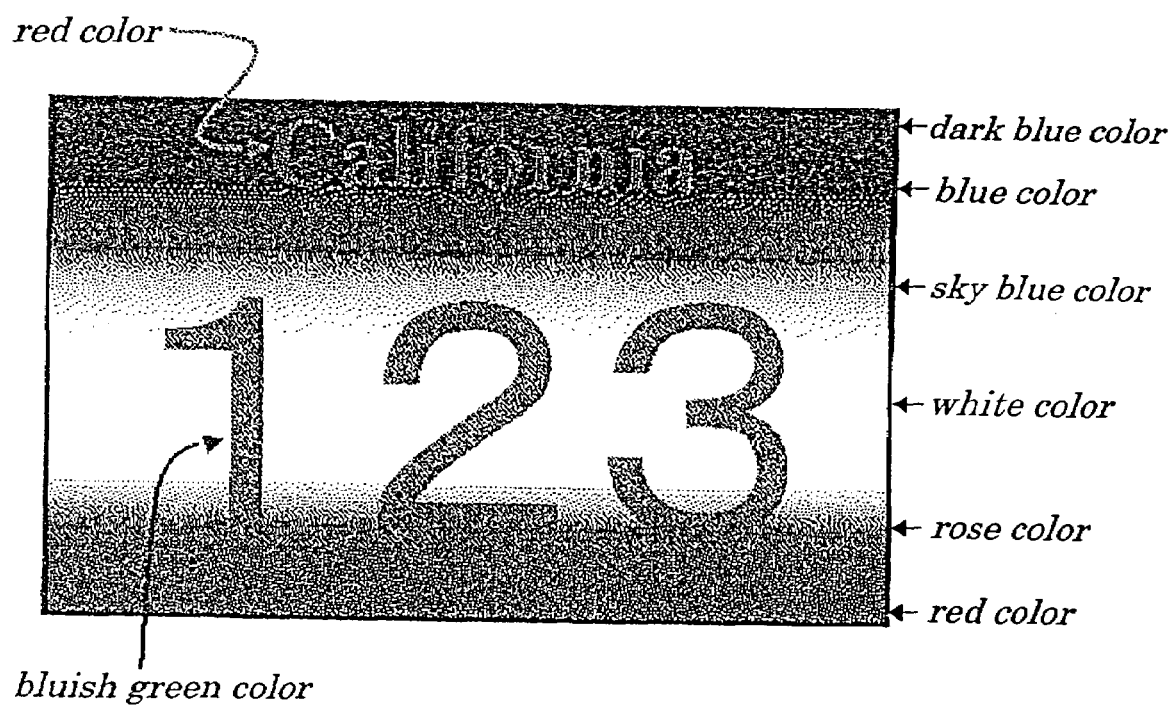
FIG. 24 is a diagram for explaining the conventional technology and for showing an example of an image obtained by displaying the color image of FIG. 23 on a gray scale.

FIG. 12 is a diagram showing an example of a color image. FIG. 13 is a diagram showing a first example of a principal color image created for the color image of FIG. 12. FIG. 14 is a diagram showing a second example of a principal color image created for the color image of FIG. 12. FIG. 15 is a diagram showing a third example of a principal color image created for the color image of FIG. 12. FIG. 16 is a diagram showing a fourth example of a principal color image created for the color image of FIG. 12. FIG. 17 is a diagram showing an example of a combined image obtained by combining a plurality of principal color images created for the color image of FIG. 12. FIG. 18 is a diagram showing another example of the combined image. FIG. 19 is a diagram for showing a combined image obtained after having removed an excessive run of the combined image of FIG. 18. FIG. 20 is a diagram explaining regions on sides of higher/lower and right/left ends of the combined image of FIG. 19. FIG. 21 is a diagram showing an example of a height and width of a connected portion in the combined image obtained after the processing performed in FIG. 20. FIG. 22 is a diagram showing an example of an image in which characters as subjects to be recognized are aligned in a mixed manner in both longitudinal and horizontal positions.

The picture reader 10 of the embodiment is so configured as to extract principal colors making up an image and to extract candidates for a picture (character) region from combined images containing the extracted principal colors and then to perform picture recognizing processing on all the extracted candidates for the picture region to improve accuracy in recognizing pictures. The picture reader 10, as shown in FIG. 1, includes an image inputting section 12, a principal color extracting section 14, a combination creating section 16, a picture (graphics) region extracting section 18, and a picture (graphics) recognizing section 20.

The image inputting section 12 captures a color image of a subject and is made up of, for example, a CCD (Charge-Coupled Device) camera and memory (not shown). The principal color extracting section 14 extracts principal colors making up a color image. The principal colors denote colors extracted as color components having high frequency of occurrence in every inputted image. In ordinary cases, a plurality of principal colors corresponding to each image is obtained. A principal color image is an image in which a value of a pixel having a color being near to each principal color is set at "1" and other pixels are set at "0".

The combination creating section 16 creates a plurality of combined images each being obtained by combining a plurality of principal colors extracted by the principal color extracting section 14. The picture region extracting section 18 extracts each picture region containing a picture to be recognized as picture region candidates from principal color images extracted by the principal color extracting section 14 and combined images created by the combination creating section 16. The picture recognizing section 20 performs picture recognizing processing on all the picture region candidates extracted by the picture region extracting section 18.

The principal color extracting section 14, combination creating section 16, picture region extracting section 18, and picture recognizing section 20 can be easily constructed by program processing on an ordinary computer or a PDA (Personal Digital Assistant) or by program processing on a portable device with a camera being equipped with any memory and any computing device. That is, programs to perform processing (shown in FIG. 2) to be described later in detail, corresponding to each of the image inputting section 12, principal color extracting section 14, combination creating section 16, picture region extracting section 18, and the picture recognizing section 20 as described above, are stored in storage devices such as a hard disk, ROM (Read Only Memory), or a like being connected to the computer or a like and, when the computer is driven to start picture reading processing, the processing program is read sequentially from the storage devices to a memory of the computer or a like and the programs are executed by the computer to perform the processing corresponding to each of the image inputting section 12, principal color extracting section 14, combination creating section 16, picture region extracting section 18, and the picture recognizing section 20.

The processing to be performed in the embodiment is described by referring to FIG. 1 to FIG. 22. When the picture reader 10 is driven, the image inputting section 12, such as a CCD camera or a like, captures an image of a subject, for example, an image of a license plate and stores the image into a memory, and the image is then read by the principal color extracting section 14 (image inputting processing S1 in FIG. 2). Processing (principal color extracting processing S2 in FIG. 2) to be performed by the principal color extracting section 14 is described sequentially.

Algorithms for extracting principal colors employed in the principal color extracting processing shown in FIG. 2 are described below. In the embodiment, the extraction of principal colors are explained by using an RGB (Red, Green, and Blue) calorimetric system being one of calorimetric systems. First, three-dimensional space of the RGB calorimetric system making up a read image is separated into small regions of 16 pcs×16 pcs×16 pcs (where "pcs" denotes "pieces") to produce a color histogram of the read image. The color histogram is created, for example, by following procedures.

First, a range that can be taken by each of primary color components, that is, each of color components of red, green, and blue colors is separated into 16 equal parts to produce value ranges (small regions) of 16 pcs×16 pcs×16 pcs. Initialization is performed with histogram values within all value ranges being set at zero. Next, attention is focused to one pixel and judgement is made as to what value range a value of each of primary color components making up the focused pixel belongs to and "1" is then added to the histogram value within the value range judged that the value of each of primary color components belongs to. By performing this processing on all pixels, a color histogram can be created.

For example, in the case of an ordinary digitalized color image in which each of primary color components is represented at 256 gray levels, by separating a value range of each of color components into 16 sets of value ranges of 0 to 15, 16 to 31, 32 to 47, . . . , and 240 to 255, a value range (zone) of 16 pcs×16 pcs×16 pcs is set which enables the number of pixels belonging to each of the value ranges to be obtained.

Next, if a histogram value within a value range (zone) is a local peak value and exceeds a threshold value given in advance, a center in the value range is used as a temporary center of principal colors. When a temporary center of the temporary principal colors in an input color image is extracted, in some cases, a plurality of temporary principal color centers is obtained. When the local peak value shown in a color histogram is to be detected, if the focused histogram value is larger than histogram values contained in all the value ranges being adjacent to one another, the focused value range can be used as a local peak value.

A case when a peak is detected in a relation between a focused value range and a value range being adjacent thereto is described by referring to FIG. 3 and FIG. 4. FIGS. 3 and 4 show an example in which each of primary color components represented at 256 gray levels is separated in 16 equal value ranges. The example should be represented originally by three-dimensional RGB space; however, to simplify the description, the example is represented by two-dimensional plane including axes of R and G colors only.

In FIG. 3, if a region shown by a hatch pattern "Ha" is set at the focused value range, value ranges being adjacent thereto are regions shown by reverse hatch patterns "Hb", and by comparing histogram values in these two regions, whether or not the focused value range is a local peak value can be judged.

Also, in FIG. 4, if one side of the focused value range (shown by a hatch pattern "Ha") is located on an R axis, value ranges shown by reverse hatch patterns "Hb" are value ranges being adjacent thereto and by comparing histogram values in these two regions, whether or not the focused value range is a local peak value can be judged. As is apparent from these two examples, it is not necessary that the comparison of histogram values is made for portions in which the histogram values are not within a minimum value range and maximum value range.

After a local peak value shown in a color histogram has been detected, whether or not the histogram value of the detected local peak value exceeds a given threshold value is judged. In processing of setting the threshold value for the judgement, a value amounting for 5% of all the number of pixels making up an input image can be set as the threshold value.

If a color histogram value within a value range is a local peak value and the histogram value exceeds a given threshold value, a center of the value range is used as a temporary principal color center. FIG. 5 shows an example of the separation of primary color components into value ranges shown in FIG. 3 in which a focused value range is a local peak and a histogram value exceeds a given threshold value and a center of the value range is represented as a black circle. The value of R in the black circle is 40 and the value of G in the black circle is 24 and the black circle serves as one temporary principal color center.

Next, a mean value of a color in which a Mahalanobis distance is a predetermined threshold value or less when the temporary principal color center is used as a center is calculated and the resulting value is used as a principal color center. As a covariance matrix used to obtain the Mahalanobis distance, a covariance matrix that can be obtained by learning in advance can be employed. For example, in order to obtain a covariance matrix by the learning, a pixel value is used which is obtained by picking up an image of a spherical or cubic subject having painted a color component corresponding to a center point within a value range of all color histograms acquired in advance on a subject, under a plurality of lighting conditions. The covariance matrix obtained as above can be applied to a value range shown in a corresponding color histogram. Moreover, one predetermined covariance matrix can be applied to all value ranges.

Also, when a threshold value is set to obtain a principal color center, if the setting is done, for example, for a color image with 256 gray levels, the threshold value can be set at a range from 1 to 255. A desirable threshold, when the Mahalanobis distance is used, can be set at a range of 5 to 30.

The purpose of obtaining the principal color center is explained by referring to FIGS. 6 and 7. These drawings are drawn two-dimensionally for simplification of the description. In FIG. 6, the range surrounded by a solid line is a value range of a local peak value shown in a color histogram and also a value range having a histogram value exceeding a predetermined threshold value. The "X" mark in the range surrounded by the solid line represents a temporary principal color center and black circular dots represent histogram values of pixels obtained in the actual image.

As shown in FIG. 6, the temporary principal color center is deviated slightly from actual mean value points represented by the black circular dots. When the mean value in the ellipse region surrounded by a small dotted line is again calculated, a new mean value point represented by the "X" mark as shown in FIG. 6 is obtained. The "X" mark shown in FIG. 7 comes nearer to actual mean value points of pixels in the vicinity of the temporary principal color center when compared with the case shown in FIG. 6. In FIG. 7, the black circular dots are smaller in size than those in FIG. 6, which is to obtain ease of seeing the drawing.

Moreover, the region in the ellipse shown by the small dotted line in FIG. 6 shows a region in which the Mahalanobis distance is a predetermined threshold value or less when the temporary principal color center ("X" mark) is used as a color center. The above processing of obtaining the temporary principal color center, that is, the processing of making a correction to the temporary principal color center, as shown by the "X" mark in FIG. 6, has a function of making a correction to the temporary principal color center that is possibly deviated from a true peak in its vicinity and, as shown in the "X" mark in FIG. 7, of extracting a value being near to the true local peak value as a principal color center.

Next, a color component in which the Mahalanobis distance is a predetermined threshold value or less when a principal color center is used as a color center is handled collectively as principal colors. To perform this processing, the covariance matrix employed when the principal color center is obtained from a temporary principal color center can be used as it is.

That is, in order to obtain the covariance matrix by learning, a covariance matrix can be produced from a pixel value obtained by picking up an image of a spherical or cubic object having, in advance, a color component corresponding to a center point of a value range of all the color histograms under a plurality of lighting conditions. The covariance matrix produced as above can be applied to principal colors within a value range shown in a corresponding color histogram value. Moreover, one predetermined covariance matrix can be employed for all principal colors.

Also, a threshold value for, for example, a color image with 256 gray levels can be set at 1 to 255. A desirable range of the threshold value can be set at, for example, 5 to 30 when the Mahalanobis distance is used.

By extracting principal colors as above, a color having a small difference in a color hue becomes a same principal color and a color having a great difference in a color hue becomes a different principal color and, therefore, the greater the difference in a color hue, the more the difference in the color hue is emphasized and, the smaller the difference in the color hue, the more the difference in the color hue is absorbed. As a result, an effect that similar colors each having a small difference in the color hue are integrated into a same principal color collectively. That is, even when lighting conditions are greatly different which occurs in such as cases in which picked-up image becomes reddish as a whole due to image-pick up in the evening or in which picked-up image becomes bluish as a whole due to image-pick up on a rainy day, irrespective of such lighting conditions, similar colors can be effectively collected and integrated suitably into one color with a difference in color being maintained on an image of a license plate, it is possible to well separate a color being used for a character from a color being used for a background.

Moreover, since the license plate being used in the North America is so designed as to be easily read by a human, even if various colors and/or designs are employed in the license plate, in extracted principal colors, colors being used for a character can be well separated from colors being used for a background.

Next, creation of principal color image is explained. Images corresponding to principal colors being equivalent to the number of principal colors extracted from an input image are prepared and when a focused pixel is judged to belong to principal colors, a pixel value in the same coordinates as the focused pixel is set at 1 and when the focused pixel is judged not to belong to principal colors, a pixel value on the same coordinate as the focused pixel is set at 0. This processing is performed on all the pixels in the prepared images. The image produced thus is called a "principal color image".

For example, if an input image is such an image as shown in FIG. 8A, the input image is separated into principal color images, one having a red color as shown in FIG. 8, another having a white color as shown in FIG. 9, still another having a dark blue color as shown in FIG. 10, and still another having a bluish green color as shown in FIG. 11. Also, if an input image is such an image as shown in FIG. 12, the input image is separated into principal color images, one having a red color as shown in FIG. 13, another having a white color as shown in FIG. 14, still another having a dark red color as shown in FIG. 15, and still another having a gray color as shown in FIG. 16.

When the above method of producing principal color images is performed, a pixel not belonging to any one of the above-mentioned principal colors appears in an input image, however, such pixels are pixels not to make up a picture region of the image, for example, a character region of a license plate and, therefore, the routine proceeds to processing following the principal color extracting processing (S2 in FIG. 2). Additionally, there is a possibility that the pixel in the input image becomes a pixel belonging to a plurality of principal colors, however, the routine proceeds to the processing to be performed after the principal color extracting processing (S2 in FIG. 2).

Next, a method of creating a combined image by combining a plurality of principal color images produced as above is described. The combined image is produced by the combination creating section 16 and its processing (combination creating processing S3 in FIG. 2) is performed by an algorithm for combining principal color images described below.

The combined image is produced by creating all combinations each made up of two principal color images that can be formed using all principal color images input by the principal color extracting section 14 into the combination creating section 16. For example, in the example in which the input image described above is the image as shown in FIG. 12, the principal color images that can be obtained are four kinds of principal color images which include images of the red color as shown in FIG. 13, the white color as shown in FIG. 14, the dark red color as shown in FIG. 15, and the gray color as shown in FIG. 16, that is, six kinds of combined images including combinations of the read color and the white color, of the read color and the dark red color, of the read color and the gray color, of the white color and the dark red color, of the white color and the gray color, and of the dark red color and the gray color can be produced. These combined images are created in a manner in which, when either of the pixel values is "1" in the coordinates on a principal color image to be combined, the pixel value of the combined image is set at "1". Otherwise, the pixel value of the combined image is set at "0".

In the example of the extraction of the principal color image described above, that is, in each of the principal color images to be extracted when the input image is the image shown in FIG. 12 including four kinds of principal color images, one being made up of the red color shown in FIG. 13, another of white color in FIG. 14, still another of dark red color in FIG. 15, and still another of gray color in FIG. 16, any principal color image is not an image to exactly represent character portions of "755". However, the combination creating section 16 combines the image of the red color shown in FIG. 13 and image of dark red color shown in FIG. 15 and, therefore, the combined image shown in FIG. 17 can be obtained.

Thus, the plurality of principal color images obtained by being combined by the combination creating section 16 can undergo character extracting processing by being considered as candidates for character regions (picture regions) by the picture region extracting section 18 as described later and, therefore, even if a character region is separated, due to adverse effects caused by a shadow or a glare (highlight) in outdoor environments, into a plurality of principal color images, character portions can be extracted in a stable manner by using the combined images.

The principal color images and combined images, as the candidates for character regions to be output from the combination creating section 16 as above, are input to the picture region extracting section 18. The picture region extracting section 18 performs the picture region extracting processing S4, as shown in FIG. 2, to extract picture regions to be recognized, that is, character (license number) regions as candidates for the picture regions, from principal color images and combined images to be input. An algorithm to realize this is described below. In the processing to be performed by the picture region extracting section 18, by extracting either of a longitudinal or horizontal run or both of the longitudinal and horizontal runs from a portion in which a pixel of a principal color image or a combined image is "1" and by removing the too long run as a noise component, the region (such as a frame or a like) in which there is a low possibility that the run is used as a character of a license plate is removed.

The judgement as to whether or not a run is too long is explained. If a horizontal run exceeds, for example, 30% of a width of an input image, the run is judged to be too long to constitute a character. If a longitudinal run exceeds, for example, 70% of a height of an input image, the run is judged to be too long to constitute a character. These too long runs are removed. For example, if the combined image as shown in FIG. 18 is input from the combination creating section 16 to the picture region extracting section 18, longitudinal and horizontal too long runs are removed according to the above conditions and the image shown in FIG. 19 appears.

After the too long runs are removed, a concatenated (linked) component having a pixel value of "1" is extracted. By comparing either and/or both of a height and/or width in coordinates of a center of the extracted concatenated component with either and/or both of the height and/or width of an input image, a noise component can be removed. For example, generally, a character to be recognized is located in a center portion of an input image and, therefore, a concatenated portion located in the extremely close vicinity of an edge of the image cannot be considered as a character to be recognized, which can be removed as a noise component. Its example is explained by referring to FIG. 20 below.

In FIG. 20, when a center of a concatenated portion is located in a portion being located in ends of upper and lower portions in an input image and within a portion being equivalent to 15% of a width of an input image or within a portion being located in ends of right and left portions in an input image and within a portion being equivalent to 10% of a height of the input image, the concatenated portion can be removed. As a result, the concatenated portions shown in FIG. 20 are removed and an image shown in FIG. 21 can be obtained.

According to the method described above, the character region representing a name of a state "UTAH" in FIG. 20 is removed, however, this removal can be avoided. For example, when a center of the concatenated portion is located in a portion being located in ends of upper and lower portions in an input image and within a portion being equivalent to 15% of a height of the input image or within a portion being located in ends of right and left portions in the input image and within a portion being equivalent to 10% of a width of the input image and when a ratio of the height to width of the concatenated portion is outside of a predetermined range, the concatenated portions can be removed as a noise component. If the ratio of the height of the above concatenated portion to its width is, for example, 0.9 or more and 10.0 or less, the concatenated portion is considered to be possibly a character portion and, when the ratio is outside of the above values, the concatenated portion can be removed as a noise component.

Similarly, a concatenated portion in which either and/or both of a height and width (in which a pixel value of "1" is consecutively displayed) of candidates for a picture region to be input are too larger or too smaller than either and/or both of the height and width of an input image is also removed as a noise component. For example, in the case in which the candidates for the picture region is what is shown by FIG. 21, when either and/or both of a width "w1" and height "h1" of a notched-shaped concatenated portion being located slightly in an upper portion of its center are compared with either and/or both of a width "W" and height "H" of the input image, if its comparison ratio is larger than a predetermined value, the concatenated portion is judged to be too large to be used as a concatenated portion of a character. More specifically, if the width "w1" of a concatenated portion exceeds 30% of the width "W" of an input image or if the height "h1" of the concatenated portion exceeds 70% of the height "H" of the input image, the concatenated portion is judged to be too large.

Additionally, the same judgement as above can be made on the concatenated portion shown in FIG. 21. When either and/or both of a width "w2" and height "h2" of the concatenated portion shown in FIG. 21 are compared with either and/or both of the width "W" and height "H" of the input image, if its comparison ratio is smaller than a predetermined value, the concatenated portion is judged to be too small to be used as a concatenated portion of a character. More specifically, if the width "w2" of the concatenated portion is 5% or less of the width "W" of the input image or if the height "h2" of the concatenated portion is 20% or less of the height "H" of the input image, the concatenated portion is judged to be too small.

If concatenated portions to be processed are left even after the processing as above, the left concatenated portions are classified so as to be objects for further character recognition. These concatenated portions are classified in order of the character recognition. First, whether or not the left concatenated portion makes up a plurality of lines is judged and, if the left concatenated portion is judged to constitute a plurality of lines, a region is extracted for every line. Next, a region corresponding to an individual character portion is classified for every line. To perform the line extraction, technology disclosed in "Cyclic Removal of Ruled Line and Cutting-down of Line from Handwritten Document" in "IEICE (The Institute of Electronics, Information and Communication Engineers) Technical Report PRMU 98-207" by Higuchi et al. can be used. In this case, an ordinary line extraction algorithm can be also employed.

For example, as shown in FIG. 22, in the case of the license plate used in the North America, in some cases, characters are aligned vertically in one line and if these vertically aligned characters are such left concatenated portions as described above, it is necessary that these concatenated portions are classified in predetermined order. In such a case as above, according to the present invention, when central coordinates of each of the concatenated portions is given as (Cx, Cy) in the coordinates as shown in FIG. 22 in which an "x" axis is assigned in a right direction of an abscissa for each extracted line and a "y" axis is assigned in an upper direction of an ordinate for each extracted line, the concatenated portions are classified in increasing order of a value obtained from an expression of "2Cx−Cy". By using this classifying method, each of the concatenated portions shown in FIG. 22 is re-assigned in order of "AB123".

The picture region extracting section 18, by performing the processing as described above, extracts concatenated portions in order and creates candidates for a picture region being an image made up of the concatenated portions and outputs the picture region candidates to the picture recognizing section 20.

Next, the picture recognizing processing (S5 in FIG. 2) to be performed by the picture recognizing section 20 and its algorithm are described below. The picture recognizing section 20 performs the picture recognizing processing (S5 in FIG. 2) on each of the candidates for the picture regions to be input. For example, in the case of the picture recognition for a character picture, an ordinary character recognizing method can be used and a confidence level being an index to represent certainty of a result from the recognition can be output at the same time.

As the character recognizing method, the method disclosed in "Character Recognition by General Learning Vector Quantization" in "IEICE Technical Report PRMU 95-219" by Sato et al. can be used. Other character recognizing method may be employed as well. Also, as a method for calculating a confidence level, for example, the method disclosed in "Evaluation Method of Character Recognizing Result in Address Reading" in "IEICE Technical Report PRMU 98-16" by Ishidera et al. can be used. Other methods for calculating a recognition confidence level may be employed.

By performing the character recognizing processing as described above, candidates having a confidence level obtained from the character recognition which is smaller than a predetermined threshold value are put out of an object for the character recognition and, therefore, even if the candidates for a character region that originally should not be an object for the recognition as candidates for the character region are input, it is possible to obtain a successful result from the character recognition of the candidates for the character region representing a correct character without outputting an erroneous recognition result.

As described above, candidates are extracted from a plurality of principal color images and combined images and the picture recognizing processing is performed on the extracted candidates for picture regions. In the picture recognizing processing, by ranking results from reading pictures for all images, for example, license numbers being characters, it is made possible to obtain candidates for a result from reading the license number in order representing a level of the confidence. For example, an mean value of character recognizing confidence levels for all character region candidates is calculated for every image and candidates having a higher mean value can be used as candidates for the license number reading result. By the ranking processing as above, the character recognizing processing is not performed on the character region candidates having been excluded from objects to be recognized, but on other character region candidates.

That is, even when there are four candidates for a character region obtained from principal color images and combined images, even if a first character is a character region candidate having been excluded from character objects to be recognized, a mean value of a character recognition confidence level of the remaining three candidates for the character region may be used. Also, a mean value of a character recognition confidence level for all character region candidates is calculated for every image and a recognition result having the best mean value of the recognition confidence level can be output as a final result of reading the license number.

Thus, in the configurations of the embodiment, by extracting principal colors according to a local peak value shown in a color histogram obtained from an input color image, separating the input color image into principal color images each corresponding to each of the extracted principal colors, creating a combined image by combining the separated principal color images, extracting character region candidates from the principal color images and the combined image, and performing character recognizing processing on all the extracted character region candidates, it is made possible to obtain a result from reading the best character according to a character recognition confidence level of a character recognition processing result.

Therefore, factors that adversely affect image-pickup of a picture to be recognized made up of very diversified colors and designs, for example, instability in the picture extraction caused by variations in lighting conditions, shadows, glares (highlights), or a like can be fully removed. As a result, the extraction of a picture region can be performed in a most desirous reference that can be contributed to inhibition of the above adverse influences, thus improving accuracy in the picture recognition.

It is apparent that the present invention is not limited to the above embodiments but may be changed and modified without departing from the scope and spirit of the invention. For example, in the above embodiment, an example using color space of RGB values is described, however, the present invention is not limited to the RGB space. Other calorimetric systems including a CMY (Cyan, Magenta, and Yellow) calorimetric system may be employed. A gray scale may be also used.

Also, in the above embodiment, in the ordinary digitalized color image in which the primary color components of RGB are expressed at 256 gray levels, the value range of each of the primary color components is separated into 16 equal parts, however, the value range may be separated into any equal part. The value range may be separated into equal parts being different for every primary color. Moreover, partial regions out of the separated regions may overlap or all regions overlie one another. Smoothing operations may be performed on the histogram once created. It is not always necessary that the value range is separated into equal parts. In any case, the value range is not fixed but may be changed in a variable manner under a predetermined condition.

In the embodiment, after the detection of a local peak value shown in a color histogram value, judgement as to whether the detected local peak value shown in the color histogram value exceeds a predetermined threshold value is made. In this case, a desirable threshold value may be set at 1% to 50% of all the number of pixels and so long as the threshold value falls within this range, any threshold value may be used. Moreover, the threshold value is not fixed but is changed in a variable manner under a specified condition.

In the processing of correcting the temporary principal color center, not only the Mahalanobis distance and Euclidean distance but also a city-block distance may be used. However, when the Euclidean distance or the city-block distance is used, it is desirous that the threshold value is set at a range of 10 to 128. Furthermore, in any case, the threshold value is not fixed but can be changed in a variable manner under a specified condition.

Also, in the case of a color image with, for example, 256 gray levels, the threshold value that can be used for the extraction of principal colors based on the principal color center can be set at a range of 1 to 255. A desirable set range of a threshold value in the case of using a Mahalanobis distance is from 5 to 30. Also, in the processing of extracting principal colors based on a principal color center, not only the Mahalanobis distance and Euclidean distance but also a city-block distance may be used. However, when the Euclidean distance or the city-block distance is used, it is desirous that the threshold value is set at a range of 10 to 128. Furthermore, in any case, the threshold value is not fixed but can be changed in a variable manner under a specified condition.

Also, any method other than described in the embodiment may be used to extract principal colors. For example, by performing a clustering operation in RGB space using a clustering algorithm such as a K-means method and by extracting principal colors by knowing which cluster a pixel belongs to, it is made possible to apply the K-means method or a like to the extraction of the principal colors and also by presuming that a color distribution is a mixed normal distribution to obtain the mixed normal distribution and by knowing which normal distribution a pixel belongs to, it is made possible to apply the mixed normal distribution to the extraction of the principal colors. Additionally, the method disclosed in Japanese Patent Application Laid-open No. 2001-201953 may be applied to the extraction of the principal colors.

The same effects as obtained in the case of the image of the license plate can be equally achieved also in the case in which a character and a background are separated from an image of a road sign or a poster.

In the creation of combined images described in the above embodiment, all combinations each being made up of two principal color images are used, however, all combinations each being made up of three principal color images or being made up of four principal color images may be used and, furthermore, any combination each being made up of any predetermined number of principal color images may be employed. The example in which combined images corresponding to the number of all combinations are created, however, the present invention is not limited to this. For example, in the evaluation on a similarity in a color hue of each of principal colors to be combined, if the color hue of each of the principal colors is too different, the combined image is not created.

For example, by comparing chromaticity of each of two principal colors to be combined, when a difference in chromaticity is larger than a predetermined threshold value or when a distance value between the two principal colors on RGB space is larger than the predetermined threshold value, such combinations are judged not to form one character and no creation of a combined image can be made not to occur. As the threshold value to be used for the judgement, when chromaticity is used, any of real numbers from 0 to 2 can be employed and when a distance in the RGB space at 256 gray levels is used, any numbers from 0 to 350 can be employed.

The effect being able to be obtained by the creation of a combined image is that, even in the case of not only an image of a license plate but also an image of a road sign or a poster, a character portion can be extracted in a stable manner without being affected by the shadow and/or glare (highlight) in outdoor environments.

In the picture region extracting processing in the embodiment, the detection of a too long run in vertical and horizontal directions is made depending on whether a length of the run in the horizontal direction exceeds 30% of a width of an input image or on whether a length of the run in the vertical direction exceeds 70% of a height of the input image, however, the detection of the run in the vertical and horizontal directions may be made depending on whether the length of the run can be freely set at a range of 1% to 99% of a width and height of the input image. These percentages may be not fixed and can be changed in a variable manner under a specified condition.

In the picture region extracting processing employed in the embodiment, the judgement on whether an extracted concatenated portion is to be removed as a noise is made depending on whether the concatenated portion being an object to be removed is located at end portions of upper and lower portions of the input image and a center of the concatenated portion is located in a portion being equivalent to 15% of a width of the input image or on whether the concatenated portion being an object to be removed is located at end portions of right and left portions of the input image and a center of the concatenated portion is located in a portion being equivalent to 10% of a height of the input image; however, the present invention is not limited to the 15% of the width of the input image and 10% of the height of the input image and these percentages may be set freely at a range of 1% to 99% of the width and height of the input image. The above percentages are not fixed but can be changed in a variable manner under a specified condition.

Also, in the picture region extracting processing employed in the above embodiment, the judgement as to whether the concatenated portion having a too large or too small width or height is to be removed as a noise is made depending on whether a width of the concatenated portion to be removed exceeds 30% of a width of an input image or on whether a length of the concatenated portion exceeds 70% of a height of the input image; however, the present invention is not limited to the above percentages and may be set freely at a range from 1% to 99% of the width and height of the input image. Also, in the embodiment, judgement as to whether a concatenated portion is too small is made depending on whether a width of the concatenated portion to be removed is 5% or less of a width of an input image or on whether a height of the concatenated portion is 20% or less of a height of the input image. However, the present invention is not limited to these percentages. The percentage may be set freely at a range of 1% to 99% of a width and height of an input image. The above percentages are not fixed but can be changed in a variable manner under a specified condition.

As the algorithm for the picture region extracting processing, a "number plate recognizing device" disclosed in Japanese Patent Application Laid-open No. 2000-251016, a "Number reader" disclosed in Japanese Patent Application Laid-open No. 2001-222680, or a like may be used. Moreover, technology disclosed in "Terop Character Recognition During Video Displaying Being Robust Against Degradation in Image Quality" in "IEICE Technical Report PRMU 98-154" by Mori et al. can be used.

In the above embodiment, the example in which the technology of the present invention is applied to a character out of pictures, more specifically to a license plate used in the North America. However, the present invention may be applied not only to the license number plate but also to a number plate being used in Japan. Moreover, the present invention may be applied not only to reading of a character but also to reading of a general picture.

Furthermore, the technology of extracting principal colors can be applied to separation of a character contained in a caption in a video from portions other than the character. The above extraction technology can be applied to an image contained in a photograph. The technology of creating a combined image can be applied to a case in which gradation processing is performed in a caption in a video or to a case in which a caption is represented in a plurality of colors in a stripe form. The combined image creation technology can be applied to an image contained in a photograph. As a result, the technology can be used for reading a character or a picture of a video caption or a like.

What is claimed is:

1. A picture reading method comprising:
    extracting color components having a high frequency of occurrence in an input image, as principal colors using a principal color extracting section;
    separating the input image into images each corresponding to each of the extracted principal colors using an image separating section; and
    combining the separated images, out of the separated images, whose principal colors have specified relation with one another using an image combining section; and
    reading a picture based on the separated images and the combined images using a picture reading section.

2. The picture reading method according to claim 1, wherein the extraction of the principal colors is performed by separating two or more color components contained in a colorimetric system representing the input image into a specified number of color component zones, by using a center of a first color component zone, as a temporary principal color center, when a color component value within the first color component zone forms a peak against color component values within second color component zones being adjacent to the first color component zone and exceeds a first pre-determined threshold value, by calculating a mean value of the color components having a value representing similarity of a color between the color components that is larger than a predetermined second threshold value, out of the color components being distributed with the temporary principal color center being used as a center and using the mean value as a principal color center, and by making each of the color components having a value representing similarity of a color between the color components that is larger than a predetermined third threshold value be contained in the principal colors, out of the color components being distributed with the principal color center being used as a center.

3. The picture reading method according to claim 1, wherein the separation of said images is performed by preparing an image for every extracted principal color, by judging as to whether a pixel for every prepared image input belongs to any one of the extracted principal colors, and by using as a first pixel value the pixel belonging to any one of the extracted principal colors, and on the other hand, by using as a second pixel value the pixel belonging to no one of the principal colors.

4. The picture reading method according to claim 1, wherein the reading of a picture is performed by extracting picture region candidates from the separated images and combined images, by performing picture recognizing processing on all the extracted picture region candidates, and by performing picture reading processing according to a result from said picture recognizing processing.

5. The picture reading method according to claim 4, wherein the extraction of picture region candidates is performed by excluding, from said picture region candidates, out of said picture region candidates in which pixel values representing the separated images and combined images occur continuously in horizontal and/or vertical directions, said picture region candidates in which the number of pixel values occurring continuously in horizontal and/or vertical directions is larger than a predetermined ratio of the number of pixels in the horizontal and vertical directions in the input image and by comparing the number of pixel values occurring continuously in the horizontal and/or vertical directions in coordinates serving as a center of the non-excluded picture region candidate with the number of the pixel occurring in the horizontal and vertical directions in the input image and by judging, based on results from the comparison, whether the non-excluded picture region candidate is used as said picture region candidates.

6. A picture reading method comprising:
- extracting color components having a high frequency of occurrence in an input image, as principal colors using a principal color extracting section;
- separating the input image into images each corresponding to each of the extracted principal colors using an image separating section;
- comparing a degree of difference in color among the principal colors making up each of the separated images using a comparing section;
- combining the separated images, out of the separated images, whose principal colors have specified relation with one another, based on a result from the comparison using an image combining section; and
- reading a picture based on the separated images and the combined images using a picture reading section.

7. The picture reading method according to claim 6, wherein the extraction of the principal colors is performed by separating two or more color components contained in a calorimetric system representing the input image into a specified number of color component zones, by using a center of a first color component zone, as a temporary principal color center, when a color component value within the first color component zone forms a peak against color component values within second color component zones being adjacent to the first color component zone and exceeds a first pre-determined threshold value, by calculating a mean value of the color components having a value representing similarity of a color between the color components that is larger than a predetermined second threshold value, out of the color components being distributed with the temporary principal color center being used as a center and using the mean value as a principal color center, and by making each of the color components having a value representing similarity of a color between the color components that is larger than a predetermined third threshold value be contained in the principal colors, out of the color components being distributed with the principal color center being used as a center.

8. The picture reading method according to claim 6, wherein the separation of said images is performed by preparing an image for every extracted principal color, by judging as to whether a pixel for every prepared image input belongs to any one of the extracted principal colors, and by using as a first pixel value the pixel belonging to any one of the extracted principal colors, and on the other hand, by using as a second pixel value the pixel belonging to no one of the principal colors.

9. The picture reading method according to claim 6, wherein the reading of a picture is performed by extracting picture region candidates from the separated images and combined images, by performing picture recognizing processing on all the extracted picture region candidates, and by performing picture reading processing according to a result from said picture recognizing processing.

10. The picture reading method according to claim 9, wherein the extraction of picture region candidates is performed by excluding, from said picture region candidates, out of said picture region candidates in which pixel values representing the separated images and combined images occur continuously in horizontal and/or vertical directions, said picture region candidates in which the number of pixel values occurring continuously in horizontal and/or vertical directions is larger than a predetermined ratio of the number of pixels in the horizontal and vertical directions in the input image and by comparing the number of pixel values occurring continuously in the horizontal and/or vertical directions in coordinates serving as a center of the non-excluded picture region candidate with the number of the pixel occurring in the horizontal and vertical directions in the input image and by judging, based on results from the comparison, whether the non-excluded picture region candidate is used as said picture region candidates.

11. A principal color extracting method comprising:
- separating two or more color components contained in a colorimetric system representing an input image into a specified number of color component zones using a separating section;
- using a center of a first color component zone, as a temporary principal color center by a temporary principal color center determining section when a color component value within the first color component zone forms a peak against color component values within second color component zones being adjacent to the first color component zone and exceeds a first pre-determined threshold value;
- calculating a mean value of the color components, using a principal color center determining section, having a value representing similarity of a color between the color components that is larger than a predetermined second threshold value, out of the color components being distributed with the temporary principal color center being used as a center and using the mean value as a principal color center, and
- extracting as principal colors, using an extracting section, the color components each having a value representing similarity of a color between the color components that is larger than a predetermined third threshold value, out of the color components being distributed with the principal color center being used as a center.

12. An image dividing method comprising:
- separating two or more color components contained in a colorimetric system representing an input image into a specified number of color component zones using a separating section;
- using a center of a first color component zone, as a temporary principal color center, by a temporary principal color center determining section, when a color component value within the first color component zone forms a peak against color component values within second color component zones being adjacent to the first color component zone and exceeds a first pre-determined threshold value;
- calculating a mean value of the color components, using a principal color center determining section, having a value representing similarity of a color between the color components that is larger than a predetermined second threshold value, out of the color components being distributed with the temporary principal color center being used as a center and using the mean value as a principal color center;
- extracting as principal colors, using an extracting section, the color components each having a value representing similarity of a color between the color components being larger than a predetermined third threshold value, out of the color components being distributed with the principal color center being used as a center;
- preparing images each corresponding to each of the extracted principal colors using a preparing section,
- judging as to whether a pixel for every prepared image belongs to any one of the extracted principal colors using a judging section; and
- separating an input image into images, using a principal color image outputting section, each corresponding to each of principal colors by using as a first pixel value the pixel belonging to any one of the extracted principal colors, and on the other hand, by using as a second pixel value the pixel belonging to no one of the principal colors, as obtained from the result of the judgment.

13. A picture reading device comprising:
a principal color extracting section to extract color components having a high frequency of occurrence in an input image, as principal colors;
an image separating section to separate the input image into images each corresponding to each of the extracted principal colors extracted by said principal color extracting section;
an image combining section to combine the separated images, out of the separated images obtained by the separating operation of said image separating section, whose principal colors have specified relation with one another; and
a picture reading section to read a picture based on said images obtained by the separation by said image separating section and said images obtained by the combination by said image combining section.

14. The picture reading device according to claim 13, wherein said principal color extracting section comprises:
a separating section to separate two or more color components contained in a colorimetric system representing the input image into a specified number of color component zones;
a temporary principal color center determining section to determine a center of a first color component zone, as a temporary principal color center, when a color component value within the first color component zone obtained by operation of said separating section forms a peak against color component values within second color component zones being adjacent to the first color component zone and exceeds a first pre-determined threshold value;
a principal color center determining section to calculate a mean value of the color components having a value representing similarity of a color between the color components that is larger than a predetermined second threshold value, out of the color components being distributed with the temporary principal color center being used as a center and to determine the calculated mean value as a principal color center; and
an extracting section to extract as principal colors the color components each having a value representing similarity of a color between the color components that is larger than a predetermined third threshold value, out of the color components being distributed with the principal color center determined by said temporary principal color center determining section being used as a center.

15. The picture reading device according to claim 13, wherein said image separating section comprises:
an inputting section to input an image for every principal color extracted by said principal color extracting section; and
a creating section to create an image made up of principal colors by judging as to whether a pixel for every image input from said inputting section belongs to any one of the extracted principal colors, and by using as a first pixel value the pixel belonging to any one of the extracted principal colors, and on the other hand, by using as a second pixel value the pixel belonging to no one of the principal colors.

16. The picture reading device according to claim 13, wherein said picture reading section comprises:

a candidate extracting section to extract picture region candidates from said images obtained by the separation by said image separating section and the combined images obtained by the combination by said image combining section;
a picture recognizing section to perform picture recognizing processing on all picture region candidates extracted by said candidate extracting section; and
a reading section to read a picture based on a result from said picture recognizing processing obtained by the recognition by said picture recognizing section.

17. The picture reading device according to claim 16, wherein said candidate extracting section comprises:
a candidate excluding section to exclude, from said picture region candidates, out of said picture region candidates in which pixel values representing said images obtained by the separation by said image separating section and said images obtained by the combination by said image combining section occur continuously in horizontal and/or vertical directions, said picture region candidates in which the number of pixel values occurring continuously in the horizontal and/or vertical directions is larger than a predetermined ratio of the number of pixels in the horizontal and vertical directions in the input image;
a comparing section to compare the number of pixel values occurring continuously in the horizontal and/or vertical directions in coordinates serving as a center of the picture region candidate not having been excluded by said candidate excluding section with the number of pixels in the horizontal and vertical directions in the input image; and
a judging section to judge, based on results from the comparison by said comparing section, whether said picture region candidates not having been excluded are used as said picture region candidates.

18. A picture reading device comprising:
a principal color extracting section to extract color components having a high frequency of occurrence in an input image, as principal colors;
an image separating section to separate the input image into images each corresponding to each of the principal colors extracted by said principal color extracting section;
a comparing section to compare a degree of difference in color among the principal colors making up the images separated by said image separating section;
an image combining section to combine the separated images, out of the separated images, whose principal colors have specified relation with one another, based on a result from the comparison by said comparing section; and
a picture reading section to read a picture based on images obtained by the separating operation of said image separating section and said images obtained by the combination by said image combining section.

19. The picture reading device according to claim 18, wherein said principal color extracting section comprises:
a separating section to separate two or more color components contained in a colorimetric system representing the input image into a specified number of color component zones;
a temporary principal color center determining section to determine a center of a first color component zone, as a temporary principal color center, when a color component value within the first color component zone obtained by operation of said separating section forms a peak against color component values within second color component zones being adjacent to the first color component zone and exceeds a first pre-determined threshold value;

a principal color center determining section to calculate a mean value of the color components having a value representing similarity of a color between the color components that is larger than a predetermined second threshold value, out of the color components being distributed with the temporary principal color center being used as a center and to determine the calculated mean value as a principal color center; and an extracting section to extract as principal colors the color components each having a value representing similarity of a color between the color components that is larger than a predetermined third threshold value, out of the color components being distributed with the principal color center determined by said temporary principal color center determining section being used as a center.

20. The picture reading device according to claim 18, wherein said image separating section comprises:

an inputting section to input an image for every principal color extracted by said principal color extracting section; and a creating section to create an image made up of principal colors by judging as to whether a pixel for every image input from said inputting section belongs to any one of the extracted principal colors, and by using as a first pixel value the pixel belonging to any one of the extracted principal colors, and on the other hand, by using as a second pixel value the pixel belonging to no one of the principal colors.

21. The picture reading device according to claim 18, wherein said picture reading section comprises:

a candidate extracting section to extract picture region candidates from said images obtained by the separation by said image separating section and the combined images obtained by the combination by said image combining section;

a picture recognizing section to perform picture recognizing processing on all picture region candidates extracted by said candidate extracting section; and a reading section to read a picture based on a result from said picture recognizing processing obtained by the recognition by said picture recognizing section.

22. The picture reading device according to claim 21, wherein said candidate extracting section comprises:

a candidate excluding section to exclude, from said picture region candidates, out of said picture region candidates in which pixel values representing said images obtained by the separation by said image separating section and said images obtained by the combination by said image combining section occur continuously in horizontal and/or vertical directions, said picture region candidates in which the number of pixel values occurring continuously in the horizontal and/or vertical directions is larger than a predetermined ratio of the number of pixels in the horizontal and vertical directions in the input image;

a comparing section to compare the number of pixel values occurring continuously in the horizontal and/or vertical directions in coordinates serving as a center of the picture region candidate not having been excluded by said candidate excluding section with the number of pixels in the horizontal and vertical directions in the input image; and a judging section to judge, based on results from the comparison by said comparing section, whether said picture region candidates not having been excluded are used as said picture region candidates.

23. A principal color extracting device comprising:

a separating section to separate two or more color components contained in a colorimetric system representing an input image into a specified number of color component zones;

a temporary principal color center determining section to determine a center of a first color component zone, as a temporary principal color center, when a color component value within the first color component zone obtained by operation of said separating section forms a peak against color component values within second color component zones being adjacent to the first color component zone and exceeds a first pre-determined threshold value;

a principal color center determining section to calculate a mean value of the color components having a value representing similarity of a color between the color components that is larger than a predetermined second threshold value, out of the color components being distributed with the temporary principal color center determined by said temporary principal color center determining section being used as a center and to determine the calculated mean value as a principal color center; and an extracting section to extract, as principal colors, the color components each having a value representing similarity of a color between the color components that is larger than a predetermined third threshold value, out of the color components being distributed with the principal color center determined by said temporary principal color center determining section being used as a center.

24. An image dividing device comprising:

a separating section to separate two or more color components contained in a colorimetric system representing the input image into a specified number of color component zones;

a temporary principal color center determining section to determine a center of a first color component zone, as a temporary principal color center, when a color component value within the first color component zone obtained by operation of said separating section forms a peak against color component values within second color component zones being adjacent to the first color component zone and exceeds a first pre-determined threshold value;

a principal color center determining section to calculate a mean value of the color components having a value representing similarity of a color between the color components being larger than a predetermined second threshold value, out of the color components being distributed with the temporary principal color center determined by said temporary principal color center determining section being used as a center and to determine the calculated mean value as a principal color center;

an extracting section to extract, as principal colors, the color components each having a value representing similarity of a color between the color components that is larger than a predetermined third threshold value, out of the color components being distributed with the principal color center determined by said temporary principal color center determining section being used as a center;

an inputting section to input an image for every said principal color extracted by said extracting section; and a principal color image outputting section to output an image made up of principal colors by judging as to whether a pixel for every image input from said inputting section belongs to any one of the extracted principal colors, and by using as a first pixel value the pixel belonging to any one of the extracted principal colors, and on the other hand, by using as a second pixel value the pixel belonging to no one of the principal colors.

25. A computer readable medium storing a controlling program to make a computer execute a picture reading method, the method comprising:

extracting color components having a high frequency of occurrence in an input image, as principal colors using an extracting section;

separating the input image into images each corresponding to each of the extracted principal colors using a separating section; and combining the separated images, out of the separated images, whose principal colors have specified relation with one another using an image combining section; and reading a picture based on the separated images using a picture reading section and the combined images.

26. A computer readable medium storing a controlling program to make a computer execute a picture reading method, said method comprising:

extracting color components having a high frequency of occurrence in an input image, as principal colors using a principal color extracting section;

separating the input image into images each corresponding to each of the extracted principal colors using an image separating section;

comparing a degree of difference in color among the principal colors making up each of the separated images using a comparing section;

combining the separated images, out of the separated images, whose principal colors have specified relation with one another, based on a result from the comparison using an image combining section; and reading a picture based on the separated images and the combined images using a picture reading section.

27. A computer readable medium storing a controlling program to make a computer execute a principal color extracting method, said method comprising:

separating two or more color components contained in a colorimetric system representing an input image into a specified number of color component zones using a separating section;

using a center of a first color component zone, as a temporary principal color center by a temporary principal color center determining section, when a color component value within the first color component zone forms a peak against color component values within second color component zones being adjacent to the first color component zone and exceeds a first pre-determined threshold value;

calculating a mean value of the color components, using a principal color center determining section, having a value representing similarity of a color between the color components that is larger than a predetermined second threshold value, out of the color components being distributed with the temporary principal color center being used as a center and using the mean value as a principal color center, and extracting as principal colors, using an extracting section, the color components each having a value representing similarity of a color between the color components that is larger than a predetermined third threshold value, out of the color components being distributed with the principal color center being used as a center.

28. A computer readable medium storing a controlling program to make a computer execute a image dividing method, said method comprising:

separating two or more color components contained in a colorimetric system representing an input image into a specified number of color component zones using a separating section;

using a center of a first color component zone, as a temporary principal color center by a temporary principal color center determining section, when a color component value within the first color component zone forms a peak against color component values within second color component zones being adjacent to the first color component zone and exceeds a first pre-determined threshold value;

calculating a mean value of the color components, using a principal color center determining section, having a value representing similarity of a color between the color components that is larger than a predetermined second threshold value, out of the color components being distributed with the temporary principal color center being used as a center and using the mean value as a principal color center;

extracting as principal colors, using an extracting section, the color components each having a value representing similarity of a color between the color components being larger than a predetermined third threshold value, out of the color components being distributed with the principal color center being used as a center;

preparing images each corresponding to each of the extracted principal colors using a preparing section, judging as to whether a pixel for every prepared image belongs to any one of the extracted principal colors using a judging section; and separating an input image into images, using a principal color image outputting section, each corresponding to each of principal colors by using as a first pixel value the pixel belonging to any one of the extracted principal colors, and on the other hand, by using as a second pixel value the pixel belonging to no one of the principal colors, as obtained from the result of the judgment.

29. A computer readable medium storing a controlling program to make a computer serve as a picture reading device, said device comprising:

a principal color extracting section to extract color components having a high frequency of occurrence in an input image, as principal colors;

an image separating section to separate the input image into images each corresponding to each of the extracted principal colors extracted by said principal color extracting section;

an image combining section to combine the separated images, out of the separated images obtained by the separating operation of said image separating section, whose principal colors have specified relation with one another; and a picture reading section to read a picture based on said images obtained by the separation by said image separating section and said images obtained by the combination by said image combining section.

30. The computer readable medium of claim 29, wherein said image separating section comprises:

an inputting section to input an image for every principal color extracted by said principal color extracting section; and a creating section to create an image made up of principal colors by judging as to whether a pixel for every image input from said inputting section belongs to any one of the extracted principal colors, and by using as a first pixel value the pixel belonging to any one of the extracted principal colors, and on the other hand, by using as a second pixel value the pixel belonging to no one of the principal colors.

31. The computer readable medium of claim 29, wherein said picture reading section comprises:
- a candidate extracting section to extract picture region candidates from said images obtained by the separation by said image separating section and the combined images obtained by the combination by said image combining section;
- a picture recognizing section to perform picture recognizing processing on all picture region candidates extracted by said candidate extracting section; and
- a reading section to read a picture based on a result from said picture recognizing processing obtained by the recognition by said picture recognizing section.

32. A computer readable medium storing a controlling program to make a computer serve as a picture reading device, the device comprising:
- a principal color extracting section to extract color components having a high frequency of occurrence in an input image, as principal colors;
- an image separating section to separate the input image into images each corresponding to each of the principal colors extracted by said principal color extracting section;
- a comparing section to compare a degree of difference in color among the principal colors making up the images separated by said image separating section;
- an image combining section to combine the separated images, out of the separated images, whose principal colors have specified relation with one another, based on a result from the comparison by said comparing section; and
- a picture reading section to read a picture based on images obtained by the separating operation of said image separating section and said images obtained by the combination by said image combining section.

* * * * *